United States Patent
Pye et al.

(10) Patent No.: US 10,597,112 B2
(45) Date of Patent: Mar. 24, 2020

(54) SUSPENSION SYSTEM

(71) Applicant: HAYES BICYCLE GROUP INC., Mequon, WI (US)

(72) Inventors: Nicholas William Pye, Carrboro, NC (US); Edward Charles Kwaterski, Cedarburg, WI (US)

(73) Assignee: HAYES BICYCLE GROUP INC., Mequon, WI (US)

(*) Notice: Subject to any disclaimer, the term of this patent is extended or adjusted under 35 U.S.C. 154(b) by 242 days.

(21) Appl. No.: 15/671,138

(22) Filed: Aug. 7, 2017

(65) Prior Publication Data

US 2017/0334504 A1  Nov. 23, 2017

Related U.S. Application Data

(62) Division of application No. 14/460,800, filed on Aug. 15, 2014, now Pat. No. 9,758,210.

(60) Provisional application No. 61/869,589, filed on Aug. 23, 2013.

(51) Int. Cl.
*B62K 25/08* (2006.01)
*B62K 25/04* (2006.01)

(52) U.S. Cl.
CPC ........ *B62K 25/08* (2013.01); *B62K 2025/048* (2013.01)

(58) Field of Classification Search
CPC .......................... B62K 25/08; B62K 2025/048

USPC ....................................................... 280/276
See application file for complete search history.

(56) References Cited

U.S. PATENT DOCUMENTS

| 8,109,163 | B2* | 2/2012 | Hudson | B64C 13/28 74/89.25 |
|---|---|---|---|---|
| 2007/0007743 | A1* | 1/2007 | Becker | B62K 25/08 280/276 |
| 2008/0041681 | A1* | 2/2008 | Shipman | B62K 25/08 188/319.2 |
| 2009/0001684 | A1* | 1/2009 | McAndrews | B62K 25/08 280/276 |
| 2009/0277734 | A1* | 11/2009 | Cox | F16F 9/49 188/285 |

\* cited by examiner

Primary Examiner — Jacob D Knutson

(57) ABSTRACT

A compression assembly/system for a front suspension fork for a bicycle is disclosed. The compression assembly/system of the front suspension fork may comprise a combination of improved functional assemblies including a hydraulic bottom-out assembly/mechanism and a low-speed compression assembly/mechanism and a high-speed compression assembly/mechanism. The compression assembly/system of the front suspension fork may comprise an externally-adjustable hydraulic bottom-out mechanism; and substantially co-located external adjustment controls for bottom-out mechanism and low-speed compression mechanism and high-speed compression mechanism. The compression assembly/system may also comprise an axially-oriented (compression) mechanism configured to transmit movement/adjustment radially from inner components to outer components of the mechanisms to be adjusted.

20 Claims, 18 Drawing Sheets

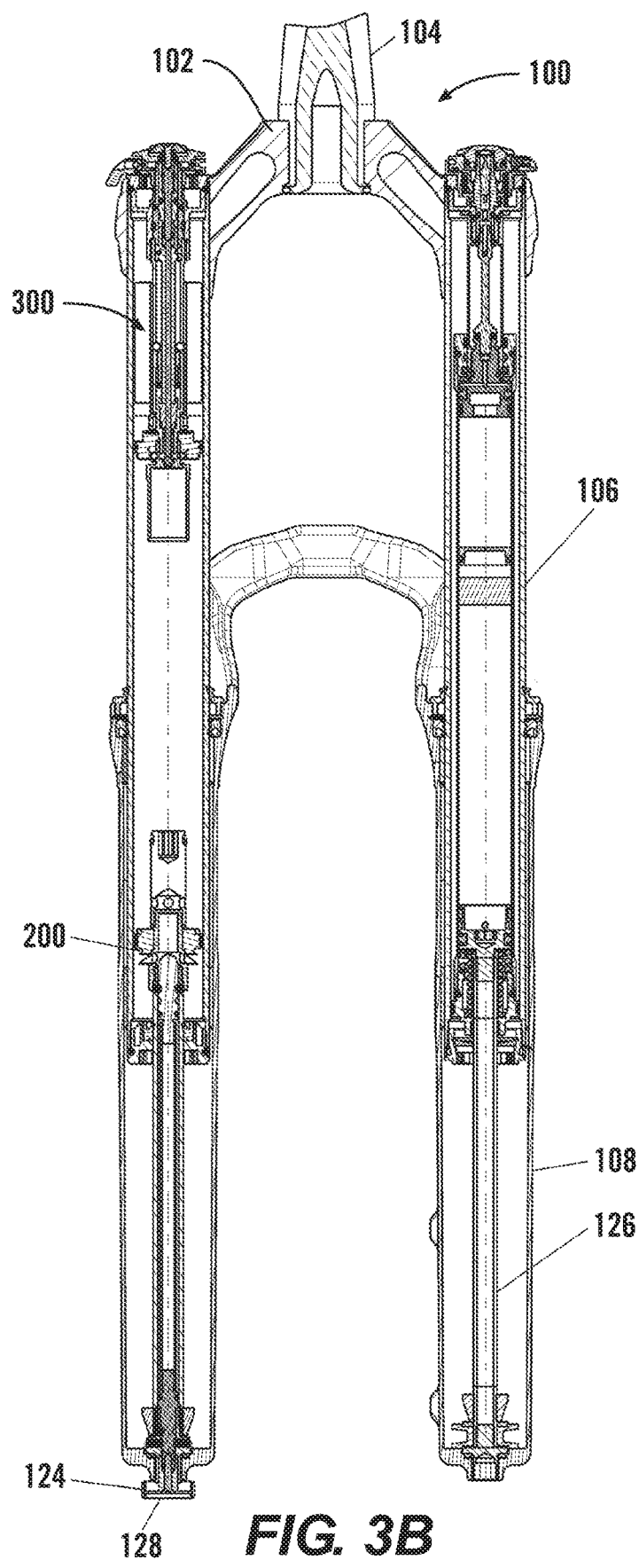
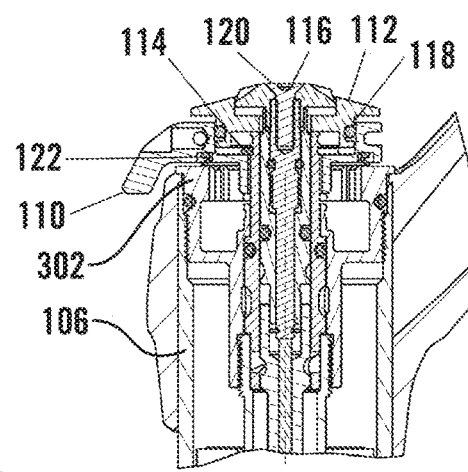
*FIG. 3B*
*FIG. 3C*

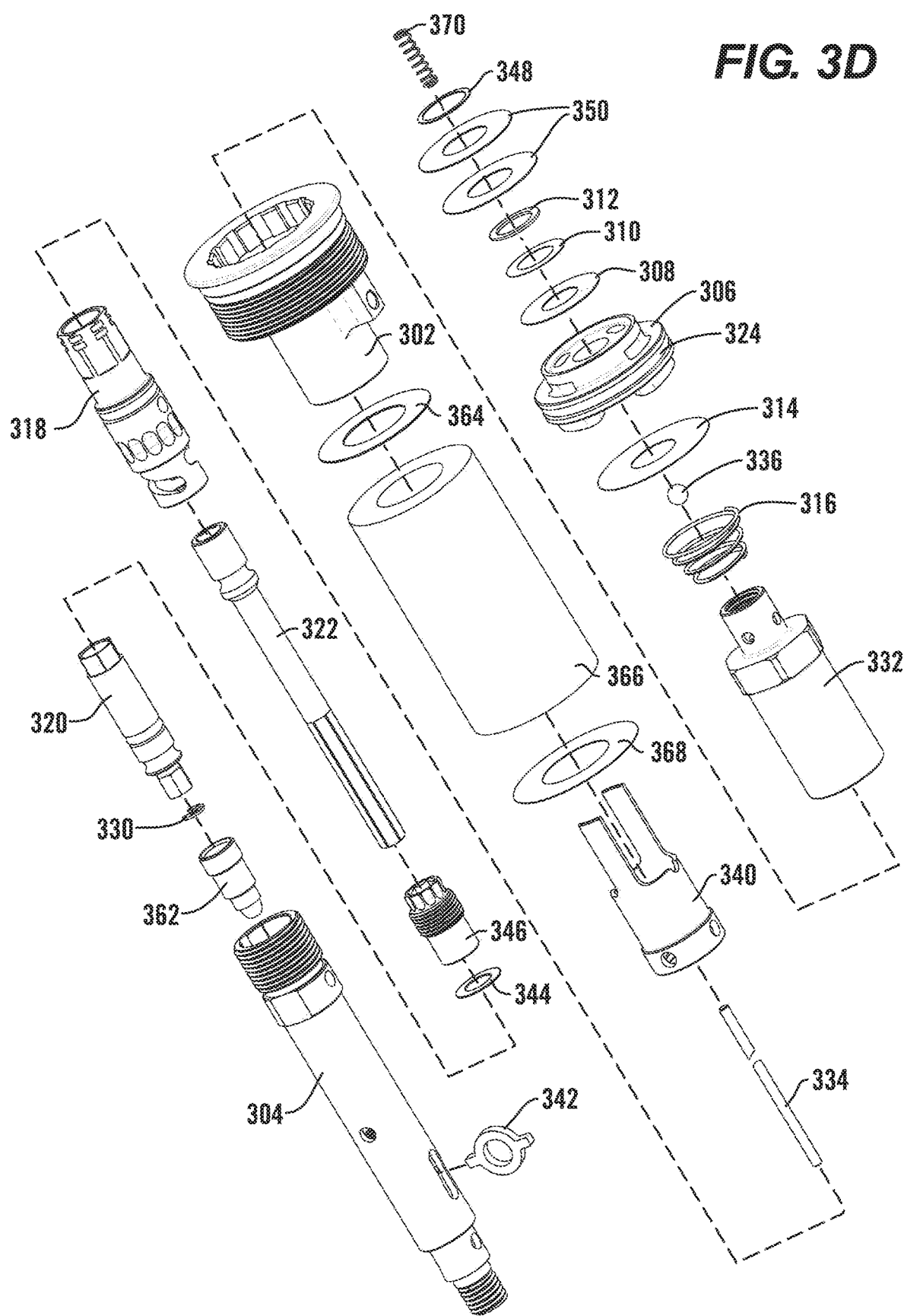

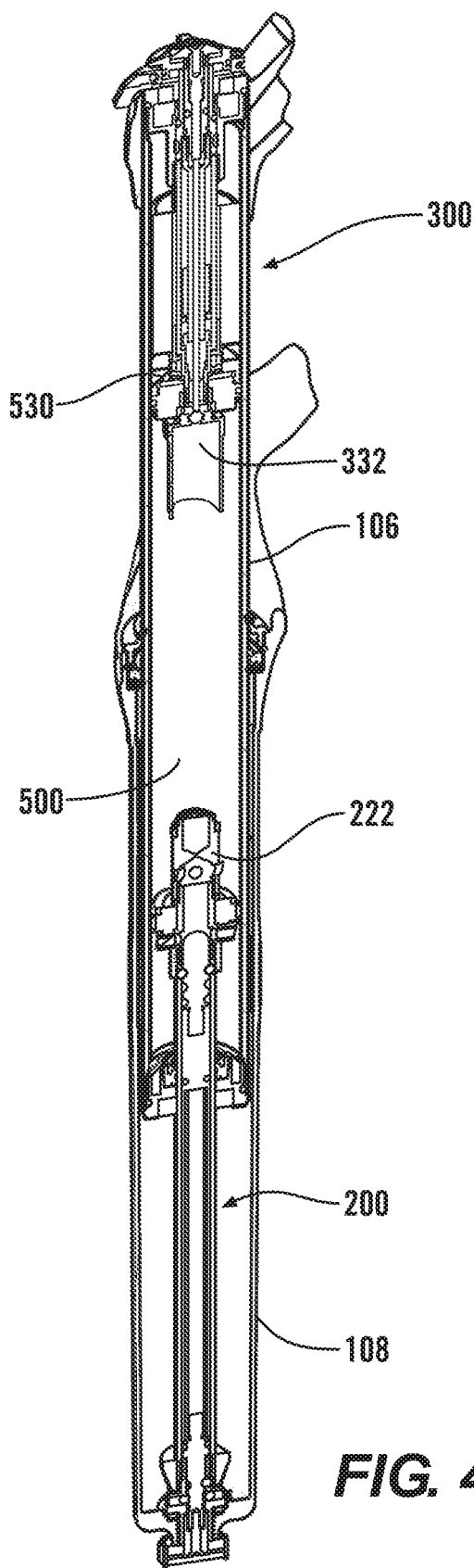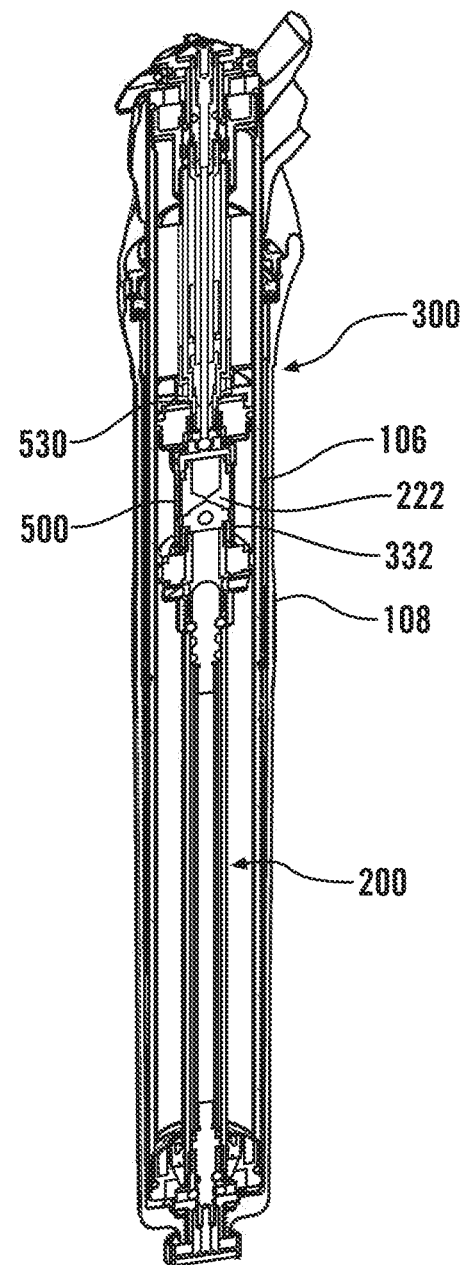
FIG. 4A
FIG. 4B

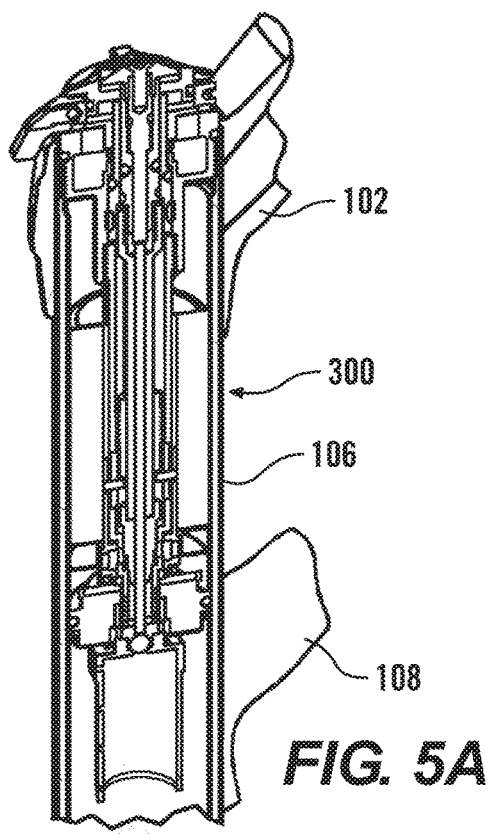
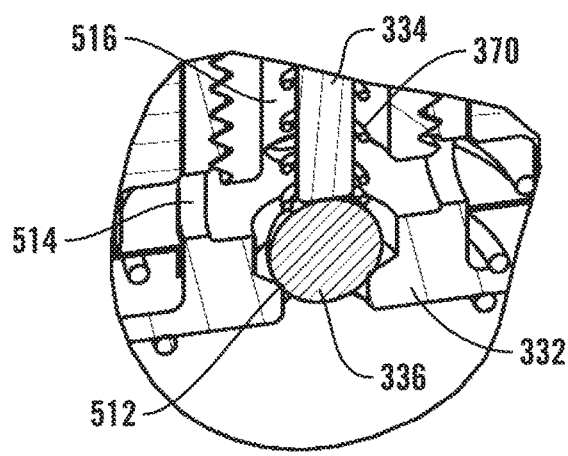
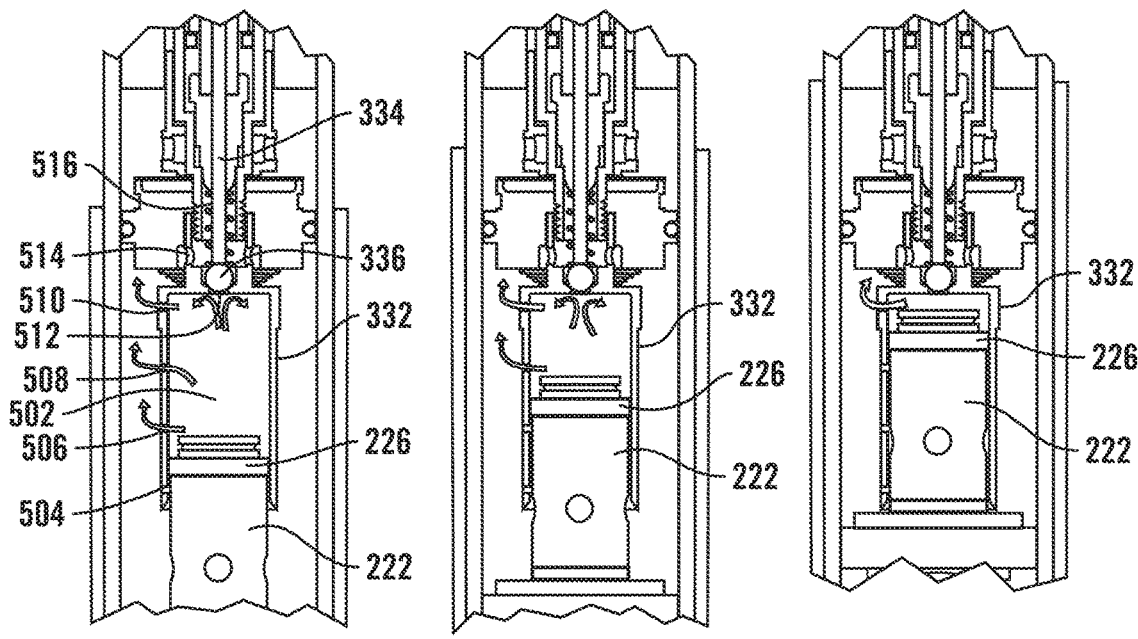
FIG. 5A  FIG. 5B  FIG. 6A  FIG. 6B  FIG. 6C

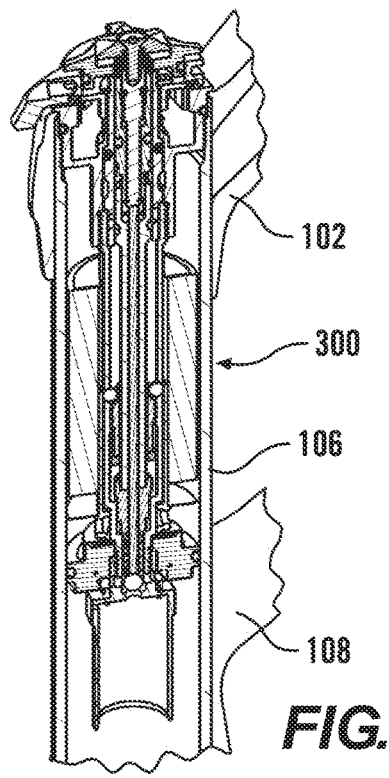
*FIG. 7A*
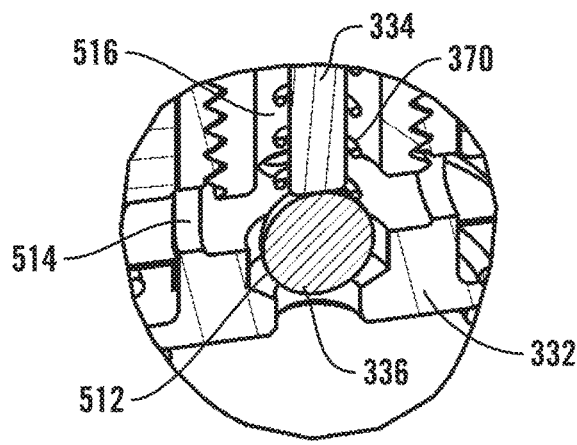
*FIG. 7B*
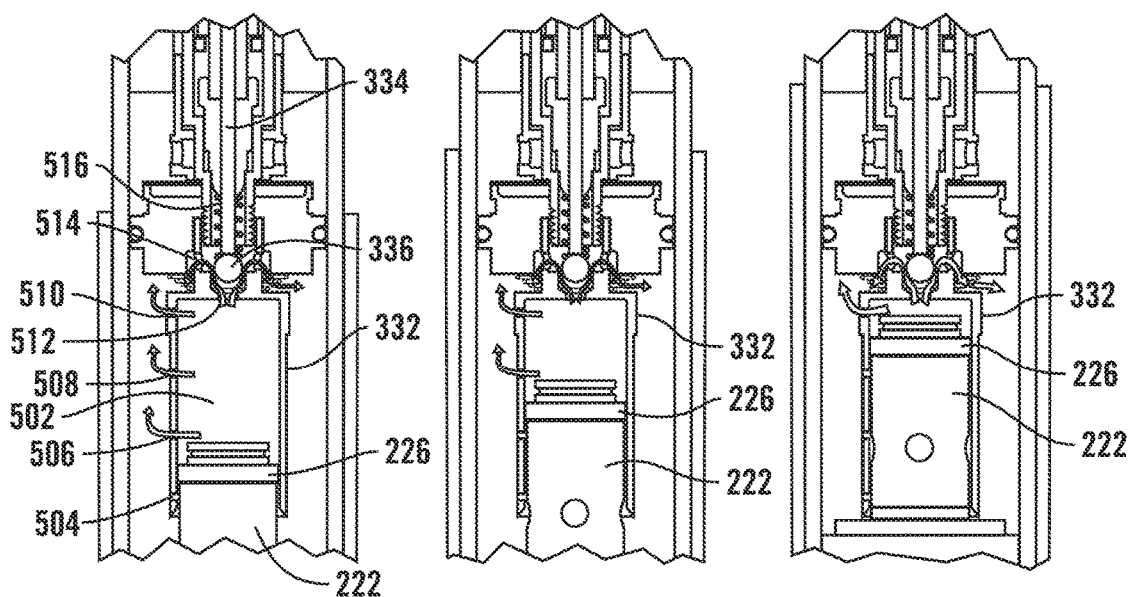
*FIG. 8A*   *FIG. 8B*   *FIG. 8C*

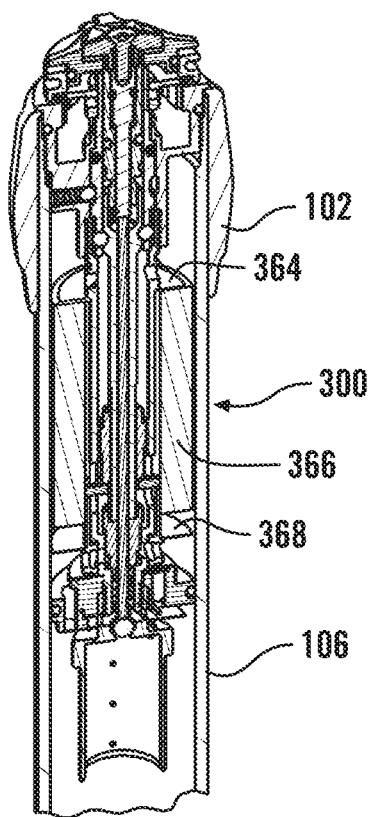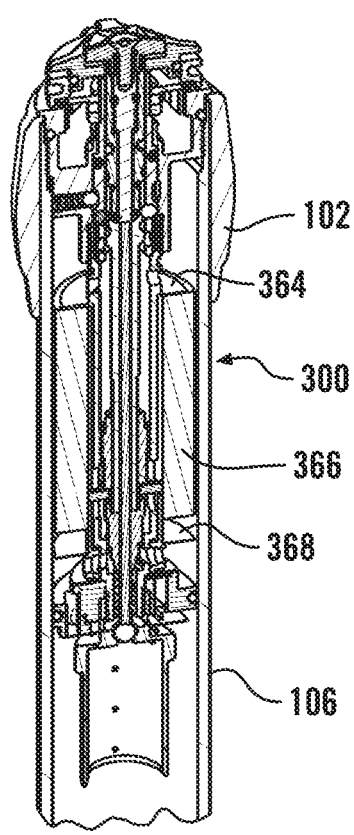
FIG. 9A    FIG. 9B
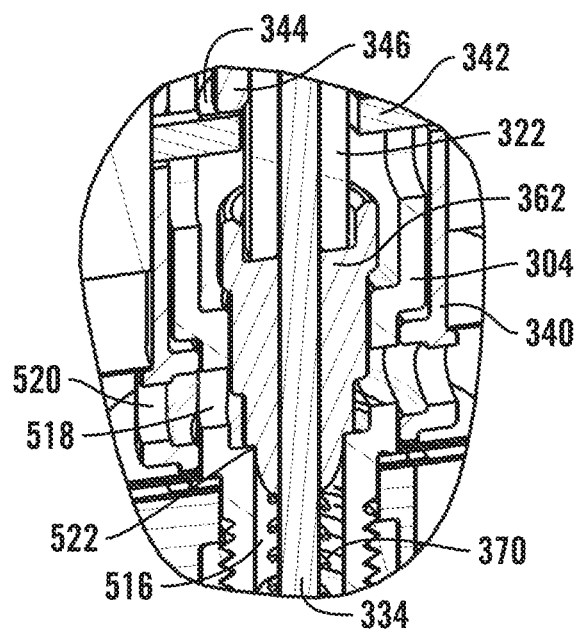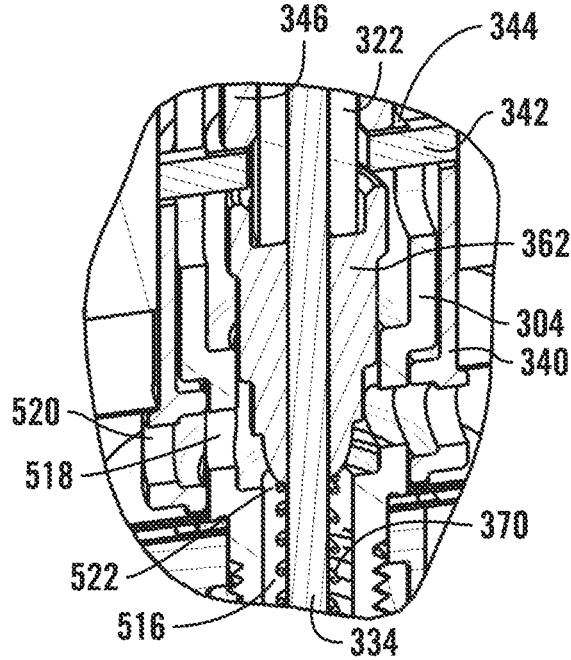
FIG. 10A    FIG. 10B

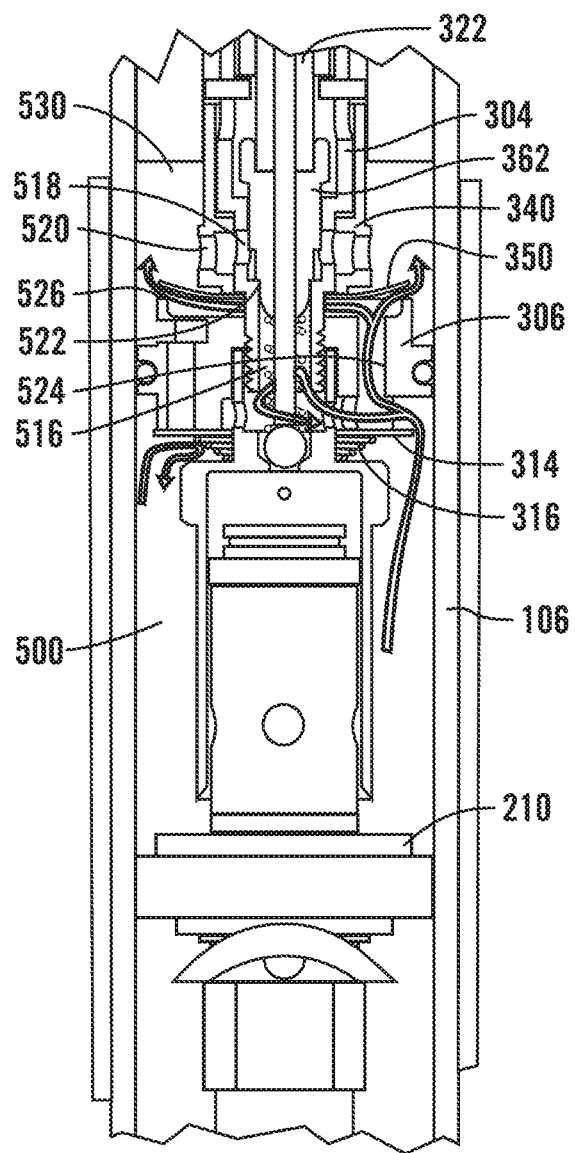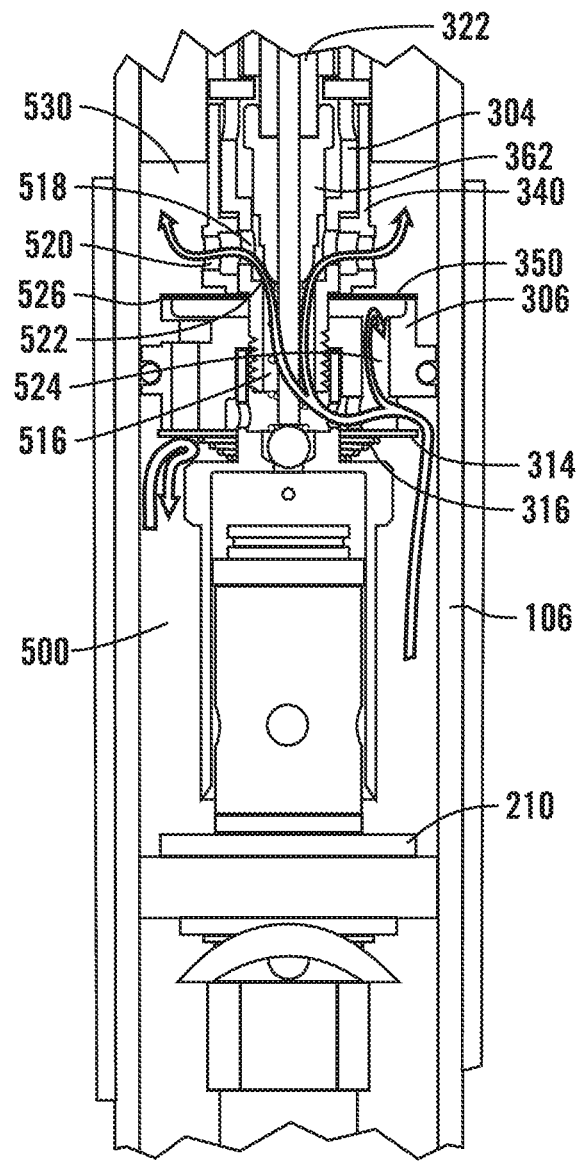
*FIG. 11A*        *FIG. 11B*

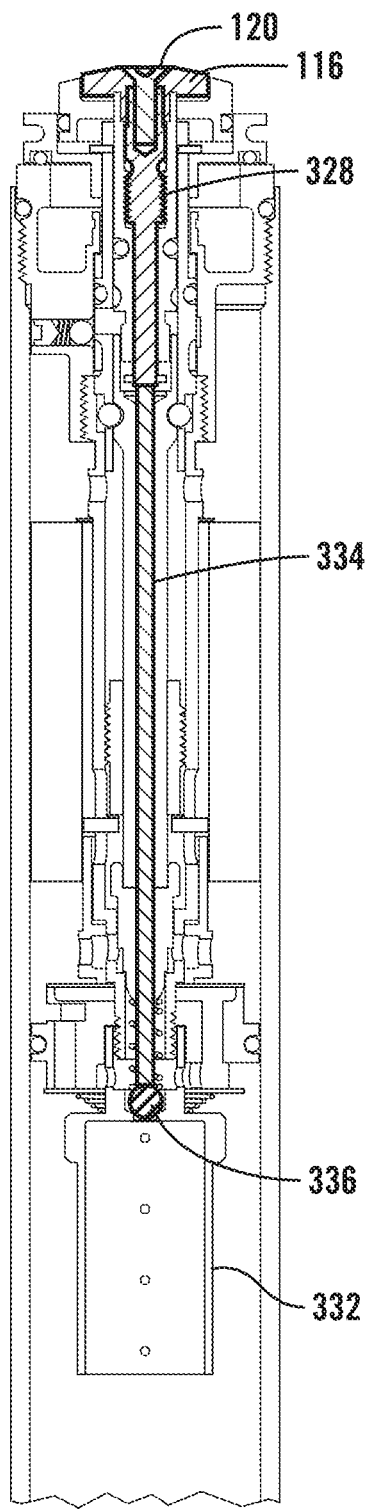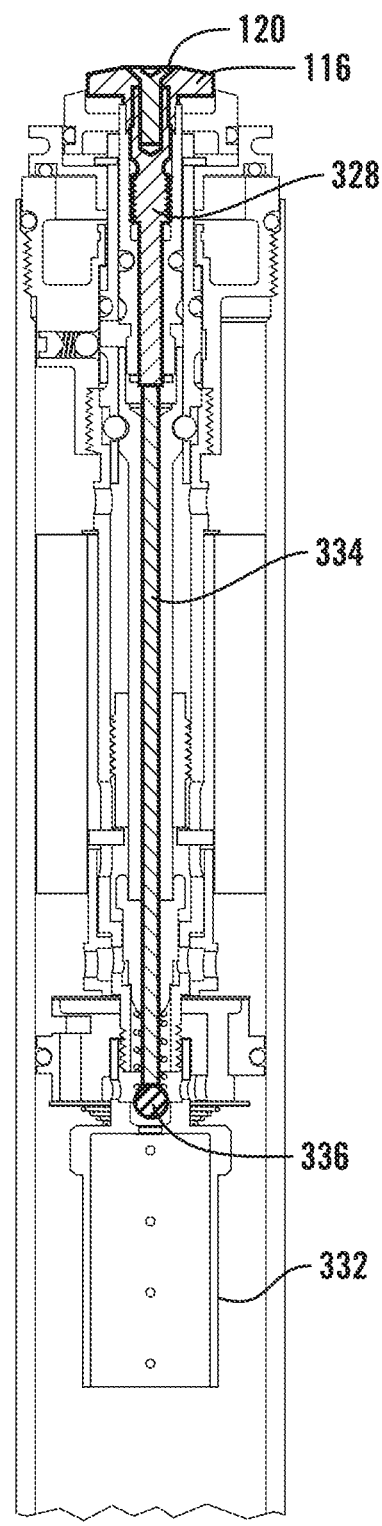
FIG. 15A                    FIG. 15B

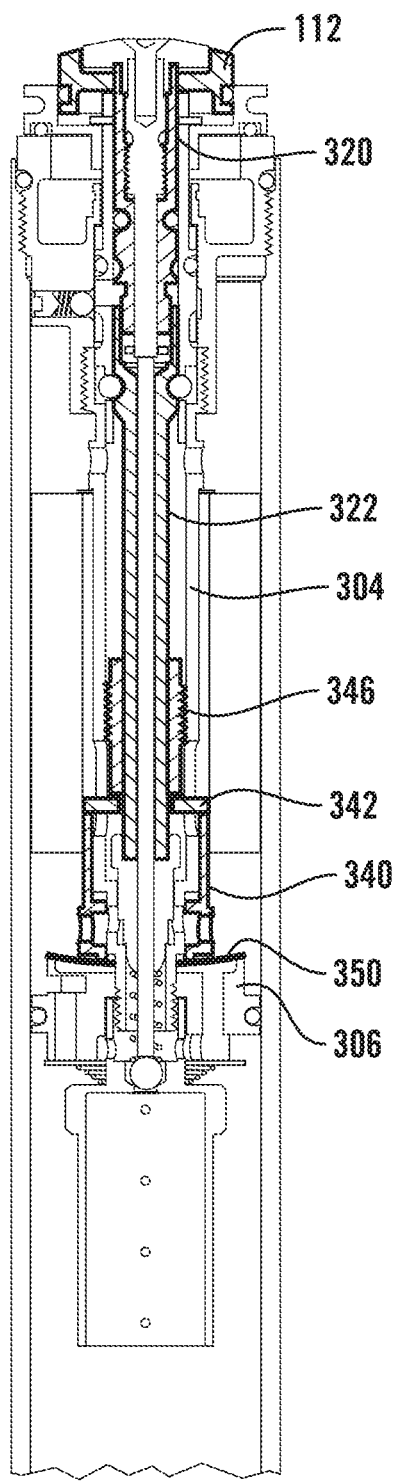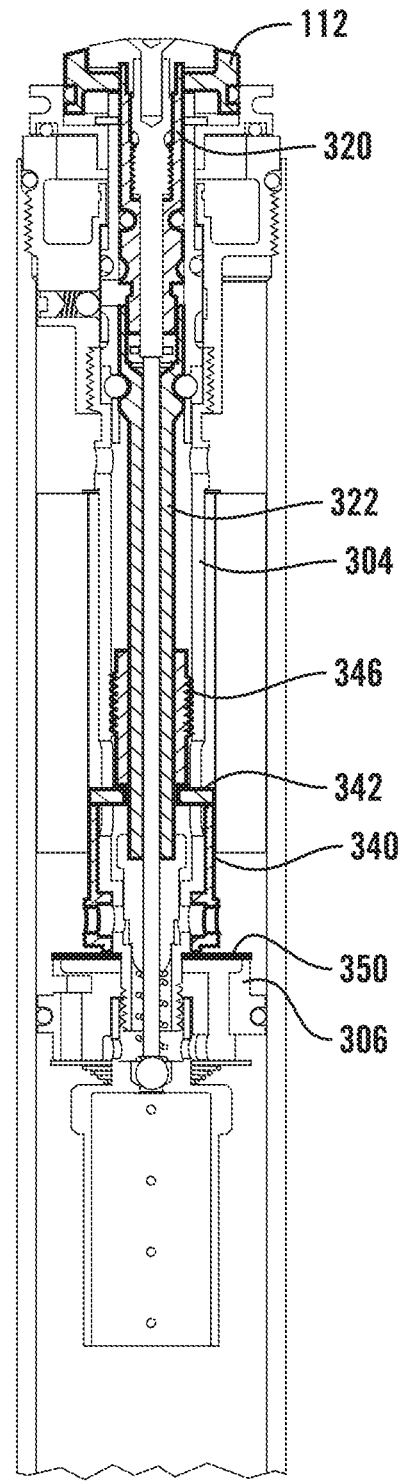
*FIG. 16A*  *FIG. 16B*

SUSPENSION SYSTEM

CROSS-REFERENCE TO RELATED APPLICATION

The present application claims the benefit of priority of and incorporates by reference the following U.S. patent applications: (a) U.S. Provisional Application No. 61/869,589 filed on Aug. 23, 2013; and (b) U.S. application Ser. No. 14/460,800 filed on Aug. 15, 2014.

The present application is a division of U.S. patent application Ser. No. 14/460,800 (now U.S. Pat. No. 9,758,210) titled "Suspension System" filed on Aug. 15, 2014.

FIELD

The present invention relates to a suspension system. The present invention also relates to a front suspension fork. The present invention further relates to a front suspension fork for a bicycle such as a mountain bike. The present invention further relates to a compression assembly/system of the suspension system. The present invention further relates to a compression assembly/system of the front suspension fork.

BACKGROUND

Bicycling may comprise a variety of riding styles and involve engagement with a variety of different types of courses and terrain. It is known to provide a front suspension fork for a bicycle such as a mountain bike. Certain riding styles may present different forces on the rider and bicycle (as well as a heightened level of voluntary risk and possibly of serious injury taken on by the rider). Certain riders may select and use a front suspension fork for their bicycle based on the appropriate anticipated riding style. Bicycling on a trail or road may result in hitting obstacles such as curbs, rocks, trees, roots, holes or similar obstacles in a manner that puts forces on a fork (including in some circumstances forces that a fork may not be designed to absorb).

A front suspension fork for a bicycle such as a mountain bike may comprise a spring and damper. According to a known arrangement the suspension fork has a central steer tube that is coupled to the bike frame and two legs with an axle for the front wheel of the bike. In a typical arrangement, a spring assembly is housed in one leg or tube of the fork and a damper assembly is housed in the other leg of the fork.

It is known to provide a front suspension fork with a damper assembly that comprises a rebound damper assembly or mechanism and a compression damper assembly or mechanism. The compression assembly operates to absorb impact (compressing/shortening the fork length); the rebound assembly operates dampen the return after impact (as the fork returns to its operating length). (When a front suspension fork is compressed to at or near full compression, the fork is said to "bottom-out".)

Riders (particularly advanced riders) may seek to improve the quality of their riding by making adjustments of the components of their bicycle, including adjustments of the damper assembly/compression assembly of the front suspension fork of their bicycle.

SUMMARY

A compression assembly for a fork may provide in a housing a set of compression systems or assemblies: (a) a bottom-out compression system (e.g. providing performance/response characteristics at or near full compression of the fork); (b) a low-speed compression system (e.g. providing performance/response characteristics for "low-speed" input such as small bumps, pedaling, cornering and braking); (c) a high-speed compression system (e.g. providing performance/response characteristics for "high-speed" input such as impact with obstructions, large objects, deep holes, etc.).

It would be advantageous to provide a front suspension fork for a bicycle with an improved configuration for the compression assembly that could be adjusted more conveniently to provide desired performance characteristics.

The present invention relates to a suspension assembly configured for use on a wheeled vehicle such as a bicycle subjected to a cycle of compression and rebound during use. The suspension assembly comprises a housing and a damping assembly configured to operate with a spring assembly in a range of travel between substantially full compression and substantially full extension and to provide a damping effect for the cycle of compression and rebound with a bottom-out system configured within the housing to operate with the damping assembly to provide a damping effect for compression approaching bottom-out in the cycle of compression and rebound. The suspension assembly also comprises an adjustment actuator for the bottom-out system positioned outside of the housing configured to allow adjustment between a substantially open setting and a substantially closed setting. The cycle of compression and rebound comprises in the range of travel (a) shortening during compression and (b) transition from compression to rebound and (c) lengthening during rebound; and wherein bottom-out of the damping assembly occurs in compression approaching and at full compression.

The present invention also relates to a suspension assembly configured for use on a wheeled vehicle such as a bicycle subjected to a cycle of compression and rebound during use. The suspension assembly comprises a housing and a damping assembly configured to operate with a spring assembly in a range of travel between substantially full compression and substantially full extension and to provide a damping effect for the cycle of compression and rebound with an assembly configured to provide adjustable low-speed damping and an assembly configured to provide adjustable high-speed damping with a bottom-out system configured to operate with the damping assembly to provide a damping effect for compression approaching bottom-out in the cycle of compression and rebound. The suspension assembly also comprises an adjustment actuator for low-speed damping, an adjustment actuator for high-speed damping, and an adjustment actuator for the bottom-out system. The adjustment actuator for low-speed damping and the adjustment actuator for high-speed damping are substantially co-located.

The present invention further relates to a suspension assembly configured for use on a wheeled vehicle such as a bicycle subjected to a cycle of compression and rebound during use comprising a damping assembly configured to operate with a spring assembly in a range of travel between substantially full compression and substantially full extension and to provide a damping effect for the cycle of compression and rebound with a first adjustment assembly configured to regulate the flow of hydraulic fluid for the damping assembly actuated by a first adjustment actuator, a second adjustment assembly configured to regulate the flow of hydraulic fluid for the damping assembly actuated by a second adjustment actuator and a third adjustment assembly configured to regulate the flow of hydraulic fluid for the damping assembly actuated by a third adjustment actuator. The first adjustment assembly and the second adjustment assembly and the third adjustment assembly are configured substantially in axial alignment; wherein each adjustment assembly has a knob at one end and each knob is configured substantially in a concentric relationship accessible exterior to the damping assembly.

The present invention further relates to an assembly comprising a first shaft and a second shaft and a third shaft each in substantially axial alignment and an adjustment actuator connected in axial alignment with the first shaft. The assembly comprises a mechanism comprising a member to transmit axial movement of the first shaft to axial movement of the third shaft with the member engaged between the first shaft and third shaft so that translation of the first shaft is transmitted by the mechanism into translation of the third shaft so that the adjustment actuator connected in axial alignment with the first shaft can be used to adjust the third shaft independent of the second shaft. Each adjustment actuator is rotated to effect adjustment.

FIGURES

FIGS. 3B-3C are cut-away cross-section views of the fork according to an exemplary embodiment.

FIG. 3D is an exploded perspective view of the compression assembly according to an exemplary embodiment.

FIGS. 4A-4B are cut-away perspective views of the fork according to an exemplary embodiment.

FIGS. 5A-5B are partial cut-away perspective views of the bottom-out assembly of the compression assembly of the fork according to an exemplary embodiment.

FIGS. 6A-6C are cut-away cross-section views of the bottom-out assembly of the compression assembly of the fork according to an exemplary embodiment.

FIGS. 7A-7B are partial cut-away perspective views of the bottom-out assembly of the compression assembly of the fork according to an exemplary embodiment.

FIGS. 8A-8C are cut-away cross-section views of the bottom-out assembly of the compression assembly of the fork according to an exemplary embodiment.

FIGS. 9A-9B are partial cut-away perspective views of the low-speed compression assembly of the compression assembly of the fork according to an exemplary embodiment.

FIGS. 10A-10B are partial cut-away perspective views of the low-speed compression assembly of the compression assembly of the fork according to an exemplary embodiment.

FIGS. 11A-11B are cut-away cross-section views of the low-speed compression assembly of the compression assembly of the fork according to an exemplary embodiment.

FIGS. 15A-15B are cut-away cross-section views of the fork showing the adjustment mechanism for the bottom-out compression system according to an exemplary embodiment.

FIGS. 16A-16B are cut-away cross-section views of the adjustment mechanism for the high-speed compression system according to an exemplary embodiment.

DESCRIPTION

Figure 1:
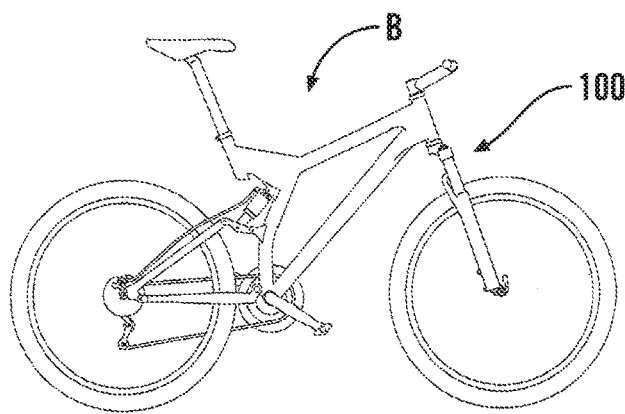
FIG. 1 is a schematic elevation view of a mountain bicycle with a suspension system according to an exemplary embodiment.
Figure 2:
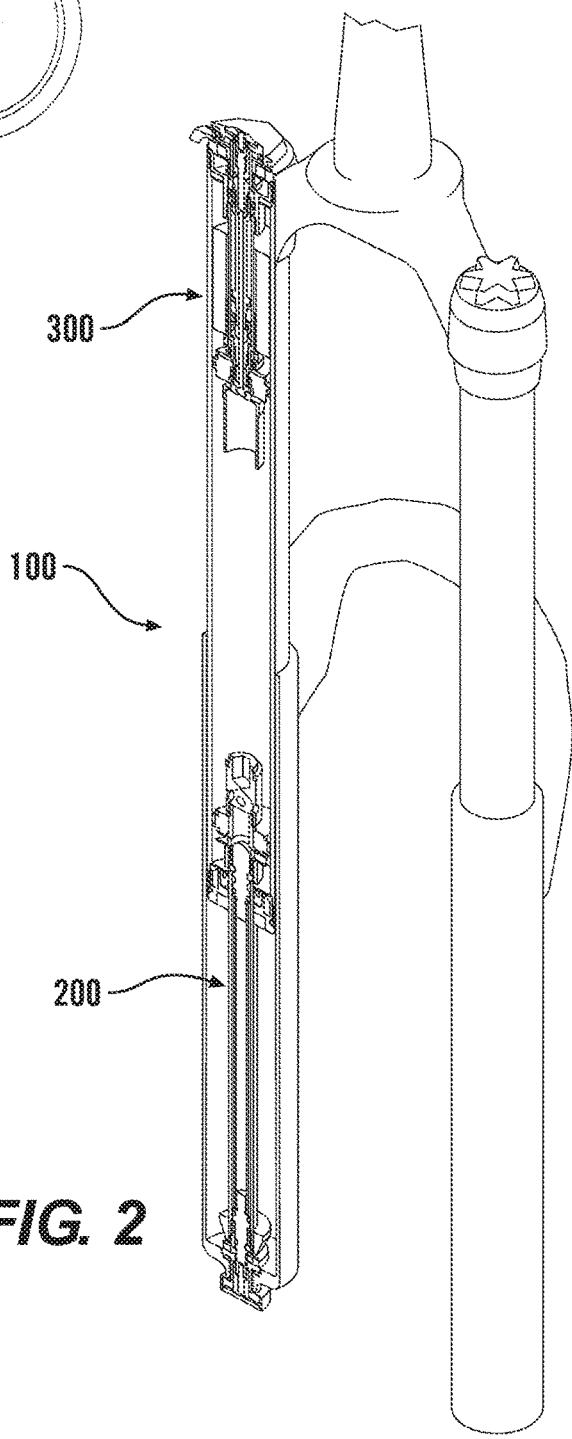
FIG. 2 is a partial cut-away perspective view of a fork for the suspension system according to an exemplary embodiment.

Referring to FIGS. 1 and 2, a mountain bicycle B with a front suspension fork 100 is shown according to an exemplary embodiment.

Referring to FIGS. 1 and 2, a front suspension fork 100 for a bicycle such as a mountain bike B is shown according to an exemplary embodiment. The front suspension fork 100 comprises a spring mechanism/assembly 126 and damper mechanism/assembly 200/300. See FIGS. 2, 5-6. As shown in FIGS. 1-2, the front suspension fork 100 has a central steer tube 104 that is coupled to the bike frame and the crown 102; crown 102 is coupled to legs 106 which telescope in a housing shown as casting 108 providing a mounting point for an axle for the front wheel of the bike. According to an exemplary embodiment, the front suspension fork 100 comprises damper assembly/system 200/300 comprising a compression assembly 300 (see FIGS. 2, 3A and 3D) and a rebound assembly 200 (see FIGS. 2, 3E and 4) containing a fluid such as hydraulic fluid. As indicated in FIG. 3B, a spring assembly 126 is housed in one leg 106 or tube of the fork and the damper assembly 200/300 is housed in the other leg of the fork.

Figure 3A:
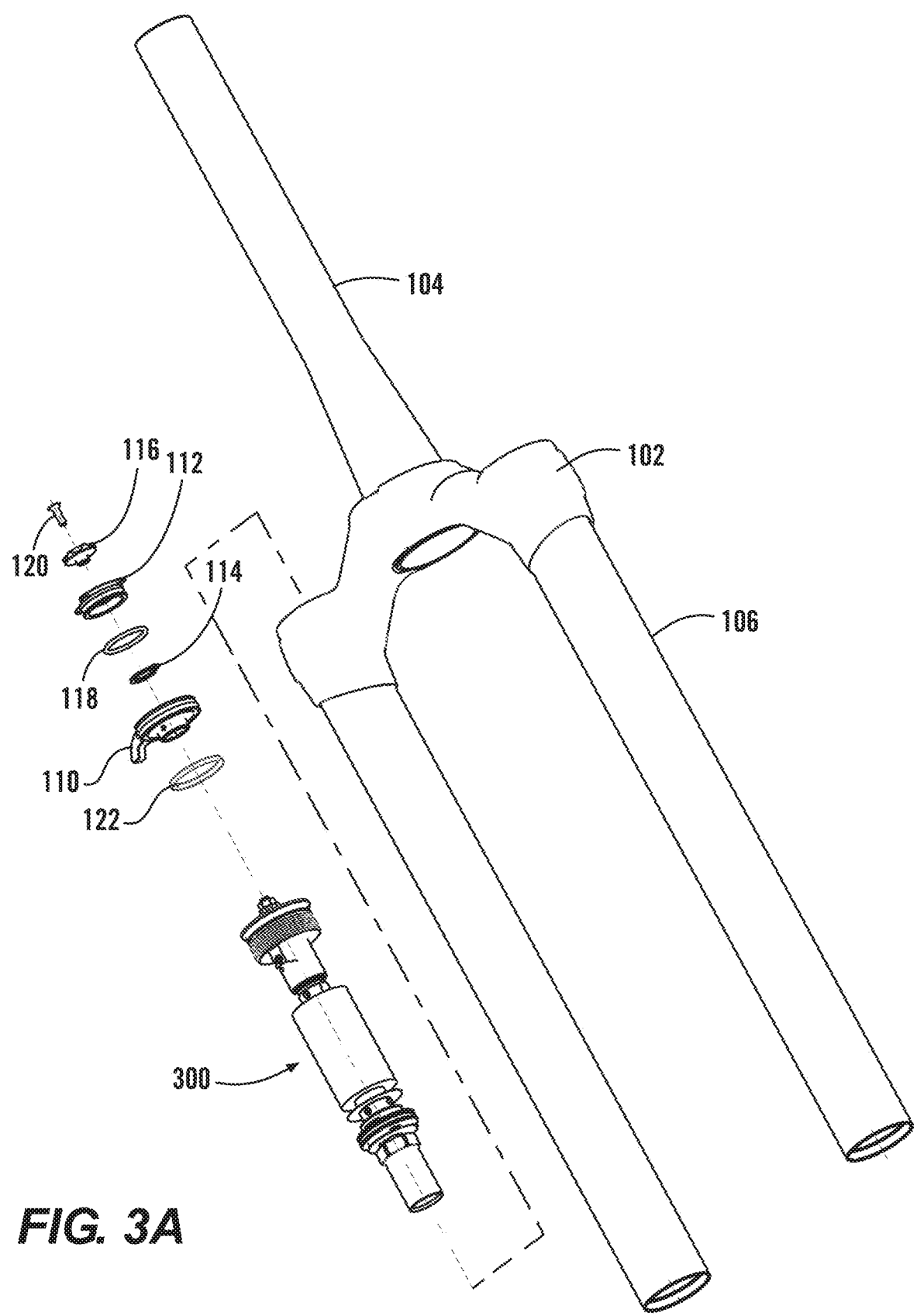
FIG. 3A is an exploded partial perspective view of the damping assembly of the fork according to an exemplary embodiment.

The front suspension fork provides a damper/damping assembly 200/300 that comprises a rebound damper assembly or mechanism 200 (see FIGS. 2, 3E and 4) and a compression damper assembly or mechanism 300 (see FIGS. 2, 3A, 3D). According to an exemplary embodiment, the compression assembly 300 operates to absorb impact (compressing/shortening the fork length); the rebound assembly 200 dampens the return after impact (as the fork returns to its operating length). According to an exemplary embodiment, the compression assembly or system 300 comprises a (1) a hydraulic bottom-out system and (2) a low-speed compression system and (3) a high-speed compression system.

Compression Assembly

Figure 17A:
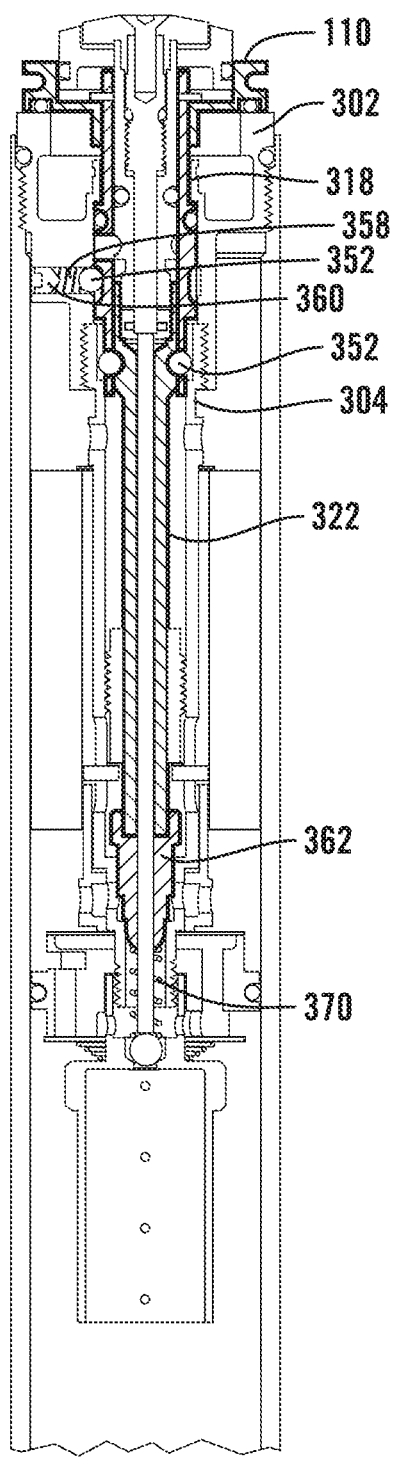
FIGS. 17A-17B are cut-away cross-section views of the adjustment mechanism for the low-speed compression system according to an exemplary embodiment.

Referring to FIGS. 2-3D, according to an exemplary embodiment as shown, compression assembly 300 is assembled and installed into leg 106 with the adjustment assembly (e.g. assembly comprising actuators for adjustment mechanisms). Referring to FIG. 3C, seal 122 is inserted on knob 110; knob 110 is installed on compression assembly 300 with retaining ring 114; O-ring 118 is inserted onto knob 112; knob 112 nests into knob 110 (on compression assembly 300); knob 116 nests in knob 112 and is secured to compression assembly 300 by screw 120. Top cap 302 of compression assembly is secured (e.g. by threaded connection) into leg 106. (As indicated in FIGS. 17A/B, top cap 302 contains spring 358 and ball 352 secured by set screw 360.)

Referring to FIG. 3D, compression assembly 300 is assembled as shown; a shim assembly comprising a set of shims (assorted) shown as forming a shim stack with shim 348 and shims 350 and shim 312 and shim 310 and shim 308 is installed on compression piston 306; compression piston 306 is provided with a seal shown as o-ring 324. Shim 314 is biased (e.g. to closed) onto the bottom of compression piston 306 by spring 316 (which fits onto bottom-out cup 332). Spring 370 engages ball 336 within the compression assembly at bottom-out cup 332. See FIGS. 3D and 15A/B.

Figure 13A:
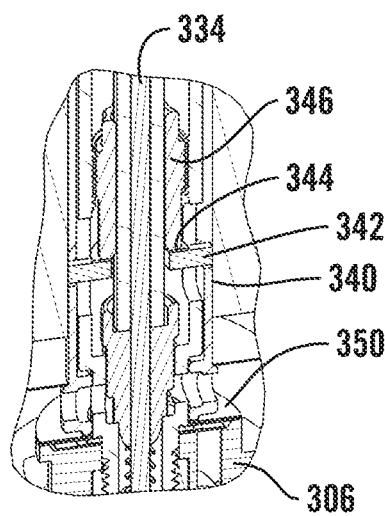
FIGS. 13A-13B are partial cut-away perspective views of the high-speed compression assembly of the compression assembly of the fork according to an exemplary embodiment.
Figure 13B:
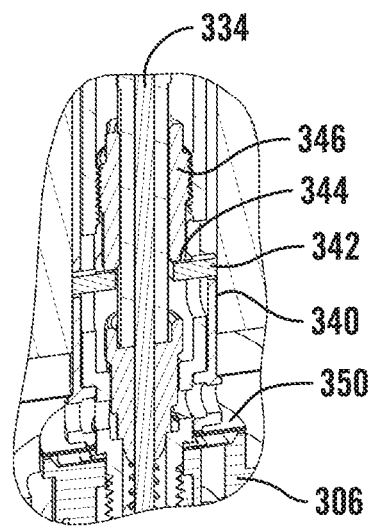

As shown in FIG. 3D, foam compensator 366 with shims/washers 364 and 368 is installed on compression shaft 304; bottom-out pin 334 is installed inside of needle adjuster 318, compression needle shaft 322 and threaded element/screw 346 (e.g. for adjustment mechanism); at screw 346, shim 344 provides a wear surface at wing washer 342 interface (e.g. at the adjustment mechanism). See also FIGS. 13A/B. Preload adjuster 320 and compression needle 362 are assembled into compression shaft 304; bottom-out adjuster 328 is threaded into connection with preload adjuster (pin) 320 and retaining ring 330 (e.g. for bottom-out adjustment). See also FIGS. 15A-15B.

As indicated, according to alternative and other exemplary embodiments, variations of the configuration of the compression assembly can be implemented.

Rebound Assembly

Figure 3E:
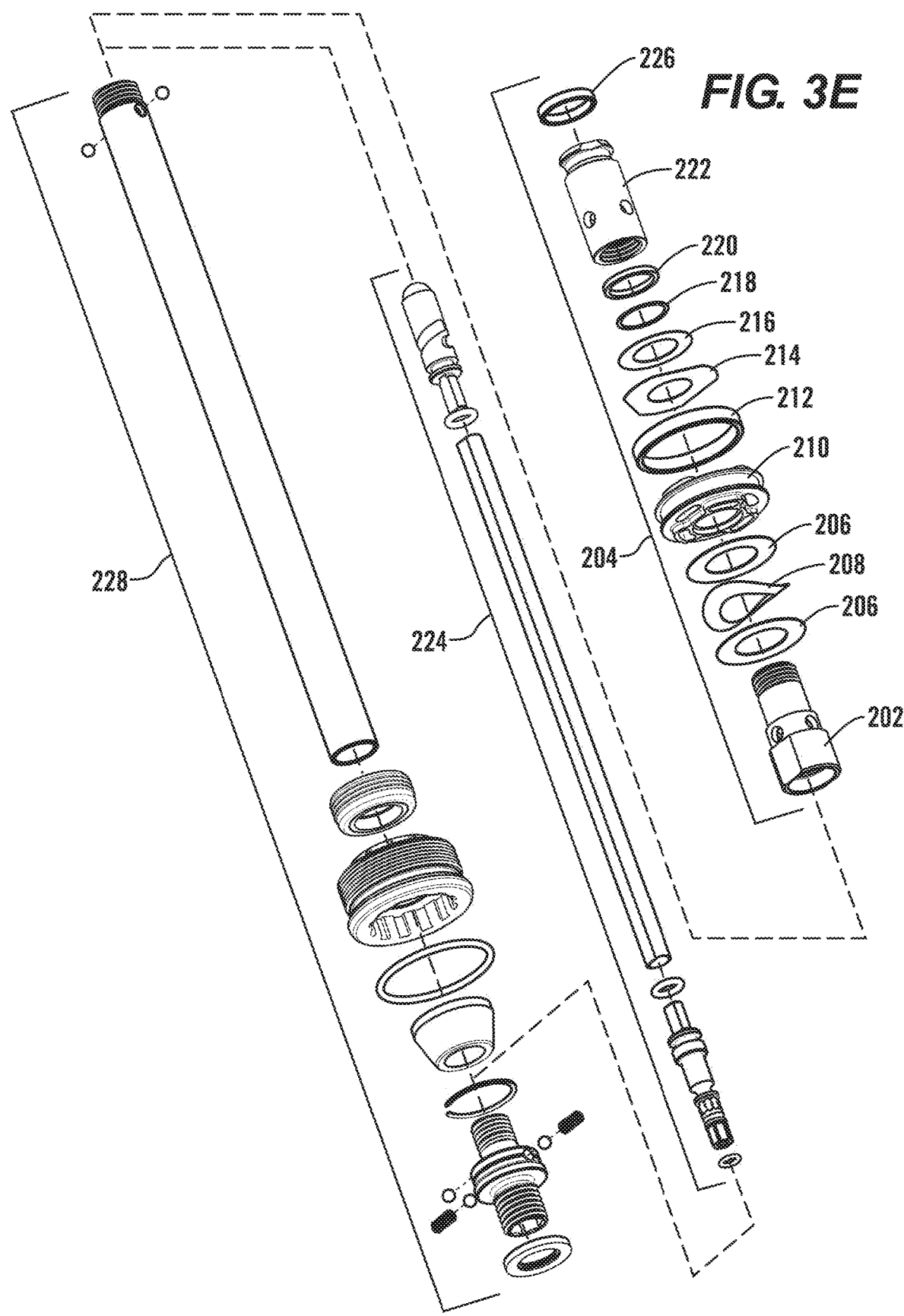
FIG. 3E is an exploded perspective view of the rebound assembly according to an exemplary embodiment.
Figure 4:
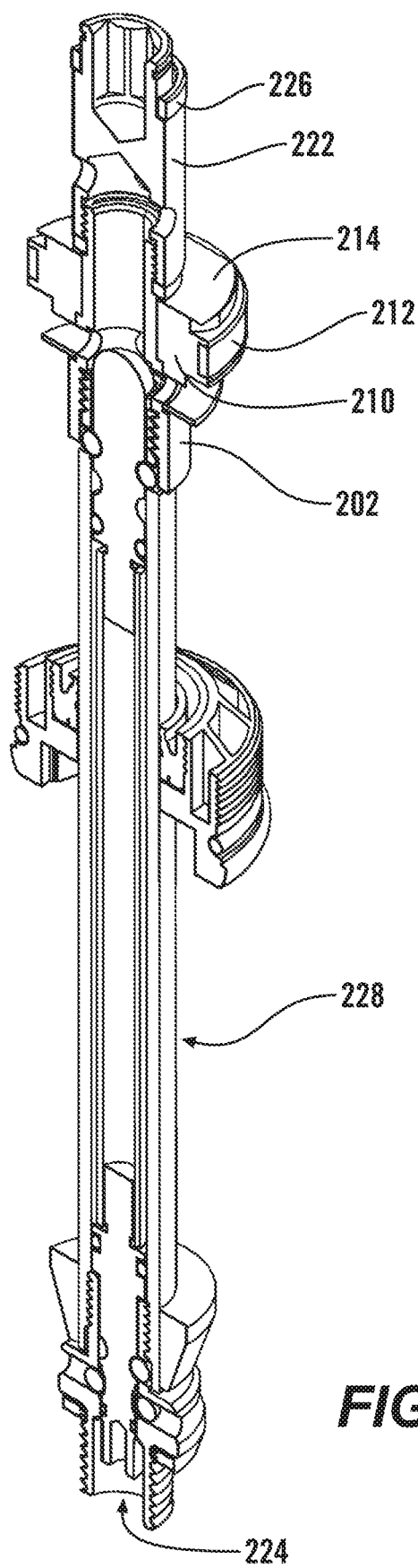
FIG. 4 is a cut-away perspective view of the rebound assembly of the fork according to an exemplary embodiment.
Figure 12A:
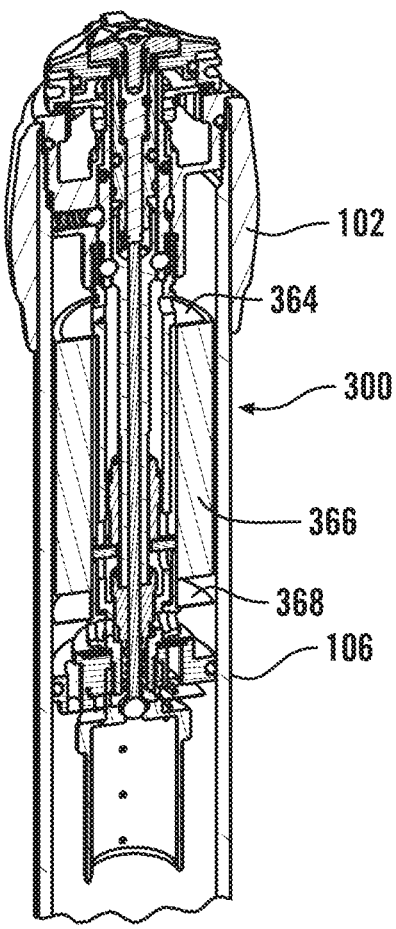
FIGS. 12A-12B are partial cut-away perspective views of the high-speed compression assembly of the compression assembly of the fork according to an exemplary embodiment.
Figure 12B:
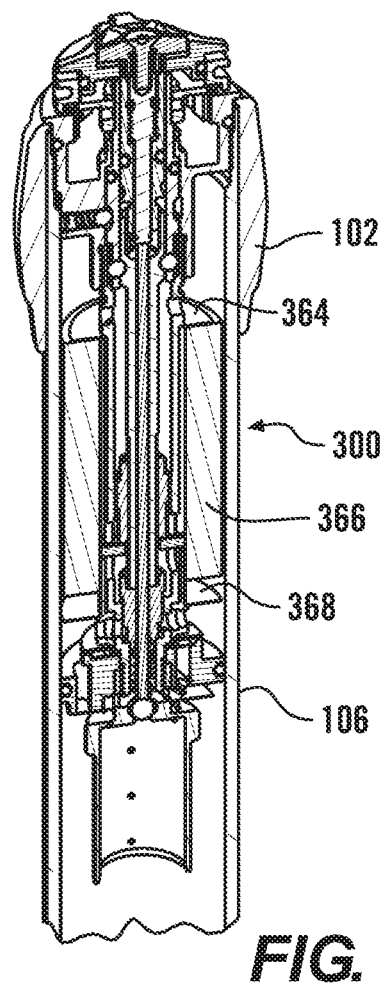

Referring to FIG. 3E, according to an exemplary embodiment, the rebound assembly 200 is shown; rebound assembly 200 comprises a rebound piston assembly 204 and a rebound needle assembly 224 within a rebound shaft assembly 228. See also FIG. 4 (assembled view of rebound needle assembly 224 and assembled view of rebound shaft assembly 228 with rebound piston assembly 204).

As shown, the rebound piston assembly provides a hydraulic bottom-out piston 222 which is configured to engage hydraulic bottom-out cup 332 of the compression assembly) and a rebound piston seat 202 (into which rebound needle assembly 224 is threaded within rebound shaft assembly 228); piston ring 212 is fitted onto rebound piston 210; piston ring 226 is fitted onto bottom-out piston 222 which is threaded onto rebound piston seat 202 through a spacer/shim assembly (e.g. across rebound piston 210) comprising spacer 220 and shim 218 and shim 216 and shim 214 (at the top of rebound piston 210) and shims 206 and shim 208 (at the bottom of rebound piston 210). See FIGS. 3E and 4.

As indicated, according to alternative and other exemplary embodiments, variations of the configuration of the rebound assembly can be implemented.

Bottom-Out Compression System

According to an exemplary embodiment, the hydraulic bottom-out compression system is shown generally in FIGS. 2, 3A-3D and 4A-8C. Adjustment of the bottom-out compression system is shown in FIGS. 15A to 15B. The operation of the bottom-out compression system is shown in FIGS. 5A-5B, 6A-6C, 7A-7B and 8A-8C. See also FIGS. 15A-15B (adjustment mechanism).

The bottom-out compression system employs a ball as a flow control element as shown in FIGS. 5B and 7B.

The bottom-out adjustment mechanism provides at the top of the leg 106 a knob 116. See FIGS. 5A and 7A. As shown in FIGS. 5A and 7A, the bottom-out compression system is provided with an externally-accessible adjustment mechanism with knob 116 accessible conveniently at the top of the leg 106 and which can be rotated in a range between the closed position and open position. See also FIGS. 15A-15B (adjustment mechanism).

Rotation of the bottom-out adjuster knob 116 rotates (coupled by hex key) a bottom-out adjuster 328 (e.g. top hydraulic bottom-out needle) and at a threaded connection axially translates the adjuster 328 to drive a (bottom) hydraulic bottom-out pin 334 (e.g. bottom shaft) that (within a central axial opening in a low-speed compression assembly) translates axially. See FIGS. 3D, 5A and 7A. As shown in FIG. 5B, a tip of the hydraulic bottom-out pin 334 (e.g. shaft) engages a ball 336 (by contact).

The bottom-out system comprises a cylindrical cup 332 with a cap that partially encloses one end of the cup. See FIG. 6A. As shown in FIGS. 6A-6C and 8A-8C, the body of the cup 332 comprises a set of axially-spaced holes or ports 504, 506, 508, 510 at points around (along) the circumference. The cap of the cup 332 provides a central axial opening or port 512 providing a receptacle for a flow control element shown as the ball 336. See FIGS. 5A and 7A. The bottom-out cup 332 (threaded to the compression (damper) shaft 304) has a cap with an opening or port 512 that provides cylindrical walls to form a receptacle for the ball 336. See FIGS. 5B, 6A-6C, 7B and 8A-8C. The adjustment mechanism is coupled to the ball 336 through an adjuster 328 and an axial shaft or pin 334. See FIGS. 5A-7A, 15A-15B.

Referring to FIGS. 4A/B to FIGS. 8A/C, operation of the bottom-out system is shown according to an exemplary embodiment; as indicated chamber 500 is configured for interface of rebound assembly 200 (at bottom) and compression assembly 300 (at top) as hydraulic bottom-out piston 222 of rebound assembly 200 moves toward engagement into hydraulic bottom-out cup 332 of compression assembly 200. See also FIGS. 6A/C-8A/C. Bottom-out chamber 502 within hydraulic bottom-out cup 332 is occupied by hydraulic bottom-out piston 222; orifice 504 and orifice 506 and orifice 508 of hydraulic bottom-out cup 333 are progressively blocked by hydraulic bottom-out piston 222 as hydraulic bottom-out piston 222 enters chamber 502 in hydraulic bottom-out cup 332 as shown progressively in FIGS. 8A and 8B and 8C. (Orifice 510 remains open to flow.) See also FIGS. 6A/C (showing progressive nesting of piston 222 in cup 332 in bottom-out condition). Ball 336 under bias of spring 370 and control of adjuster 334 at the adjustment mechanism (via knob 116) may be positioned to obstruct flow (see FIGS. 5B and 6A/C) or to permit flow through ball orifice 512 into outlet passage 514 and outlet passage 516 (see FIGS. 7B and 8A/C).

When the mechanism is "closed" the tip of the pin 334 is driven into the ball 336 which is driven into obstruction of the port 512 of the cap of the cup 332 as substantially to close the port. See FIG. 5B. Flow of fluid from inside the cup 332 is blocked from exiting at the port 512. See FIGS. 6A-6C.

When the mechanism is "open" the tip of the pin 334 is substantially released from the ball 336 and the ball 336 is no longer in obstruction of the port 512 of the cap of the cup 332. See FIG. 7B. Flow of fluid from inside the cup 332 may pass through the port 512 (and around the ball 336). See FIGS. 8A-8C.

As shown in FIGS. 5A-5B and 7A-7B, the adjustment mechanism allows the bottom-out compression mechanism to be adjusted between a "closed" setting (or position) and an "open" setting (or position). See also FIGS. 15A-15B (adjustment mechanism). In the closed position the hydraulic bottom-out pin 334 is extended and the ball 336 is driven and secured (compressed or held) into the opening or port 512 of the cap of the bottom-out cup 332 and obstructs flow of fluid through the opening or port 512 in the bottom-out cup 332. See FIGS. 5B and 6A-6C. In the open position, the tip of the hydraulic bottom-out pin 334 is retracted and disengages the ball 336 (while holding the ball 336 within the cylindrical walls of the cap of the bottom-out cup 332). See FIGS. 7B and 8A-8C. The ball 336 no longer is held in position to obstruct flow of fluid through the port or opening 512 in the bottom-out cup 332 when the adjustment mechanism is open. Compare FIGS. 5B and 7B.

As schematically indicated in FIGS. 6A-6C and 8A-8C the setting of the bottom-out compression mechanism will determine the flow characteristics and therefore the bottom-out response of the compression assembly 300 (system). See also FIG. 18B.

Low Speed Compression System

Figure 17B:
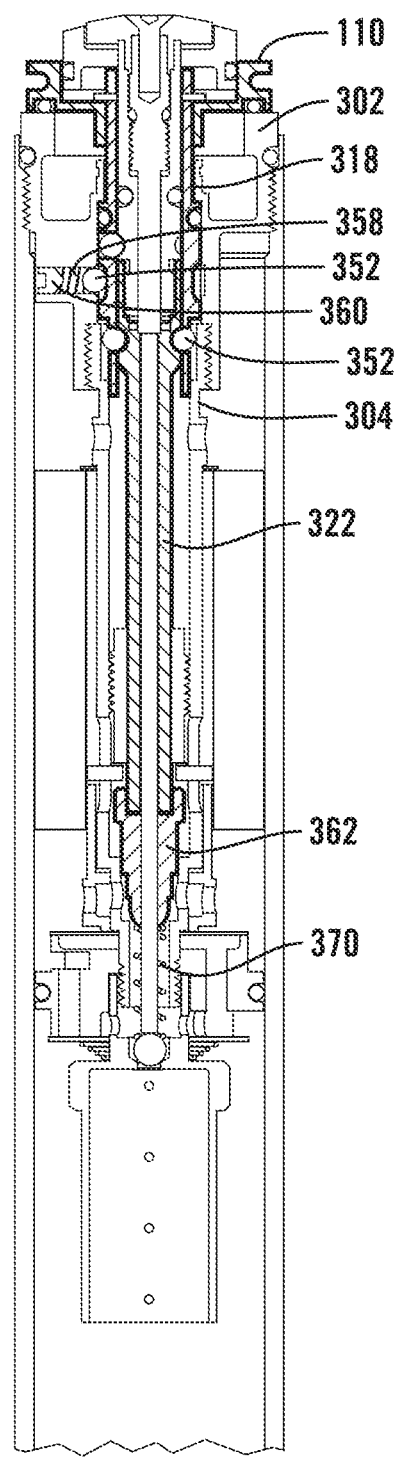

According to an exemplary embodiment, the low-speed compression system is shown generally in FIGS. 2, 3A-3D, 4A-4B, 9A-9B and 10A-10B. Adjustment of the low-speed compression system is shown in FIGS. 17A to 17B. The operation of the low-speed compression system is shown in FIGS. 11A to 11B.

The low-speed compression system employs a compression needle 362 as a flow control element as shown in FIGS. 3D and 10A-10B.

The low-speed adjustment mechanism provides at the top of the leg 106 a knob 110. See FIGS. 17A-17B (adjustment mechanism). As indicated in FIGS. 17A and 17B, rotation of the low-speed adjuster knob 110 rotates a low-speed adjuster 318 (needle adjuster) which translates a ball spline interfaces 352 which translates a generally cylindrical hollow compression (damper) needle shaft 322 (installed over the bottom-out compression pin 334). The compression needle shaft 332 is coupled at bottom to a cap of the compression needle 362; the needle 362 provides a nose configured to fit with a port or opening 522 in the center of the cap of the compression shaft 304. See FIGS. 10A and 10B. When the knob 110 is rotated the adjuster 318 (connected to the knob 110) rotates; the ball 352 moves (up or down) in the helical path (of the spline interface of the compression needle shaft 322) (lower in the "max" position and higher in the "min" position). A spring 370 is installed between the needle 362 and the ball 336 to prevent "rattle" (spring provides a very low install/spring force).

The adjustment mechanism allows the low-speed compression mechanism to be adjusted between a "closed" setting (or position) and an "open" setting (or position). Compare FIGS. 10A and 10B. See also FIGS. 17A-17B (adjustment mechanism). In the closed position the exterior of the nose of the compression needle 362 is seated within the rim of the opening 522 in the cap of the compression shaft 304; flow through the opening 522 in the compression shaft 304 is obstructed by the nose of the compression needle 362. See FIGS. 10A and 11A. In the open position the compression needle 362 has been translated upward and the nose is lifted out of the opening 522 in the compression shaft 304 and a path for flow at fluid is provided through the opening adjacent and around the nose. See FIGS. 10B and 11B.

Referring to FIGS. 11A/B, operation of the low-speed compression system is shown according to an exemplary embodiment. Flow of fluid from lower chamber 500 into upper chamber 530 is regulated by the flow control element of the low-speed compression system (e.g. comprising compression needle 362 and related assembly). As indicated in FIG. 11A, when compression needle 362 is fully seated (in compression shaft 304) flow through orifice 522 and passage 516 is obstructed; as indicated in FIG. 11B, when compression needle 362 is adjusted to open flow passes through passage 516 orifice 522 and through outlet 518 and outlet 520 (from lower chamber 500 into upper chamber 530). (FIGS. 11A/B also show flow through the high-speed compression system.)

As indicated in FIGS. 11A and 11B, the setting of the low-speed adjustment mechanism will determine the flow characteristics and therefore the low-speed (damping) response of the compression assembly (system). See also FIG. 18A.

High-Speed Compression System

According to an exemplary embodiment, the high-speed compression system is shown generally in FIGS. 2, 3A-3D, 12A-12B, 13A-13B. Adjustment of the high-speed compression system is shown in FIGS. 16A to 16B. The operation of the high-speed compression system is shown in FIGS. 14A to 14B.

Figure 14A:
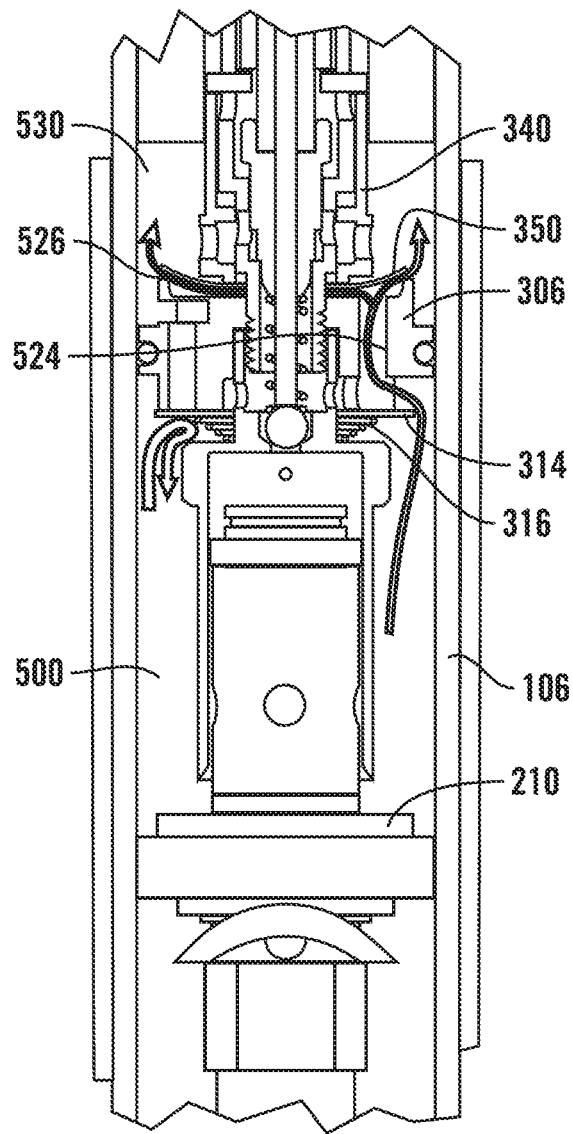
FIGS. 14A-14B are cut-away cross-section views of the high-speed compression assembly of the compression assembly of the fork according to an exemplary embodiment.
Figure 14B:
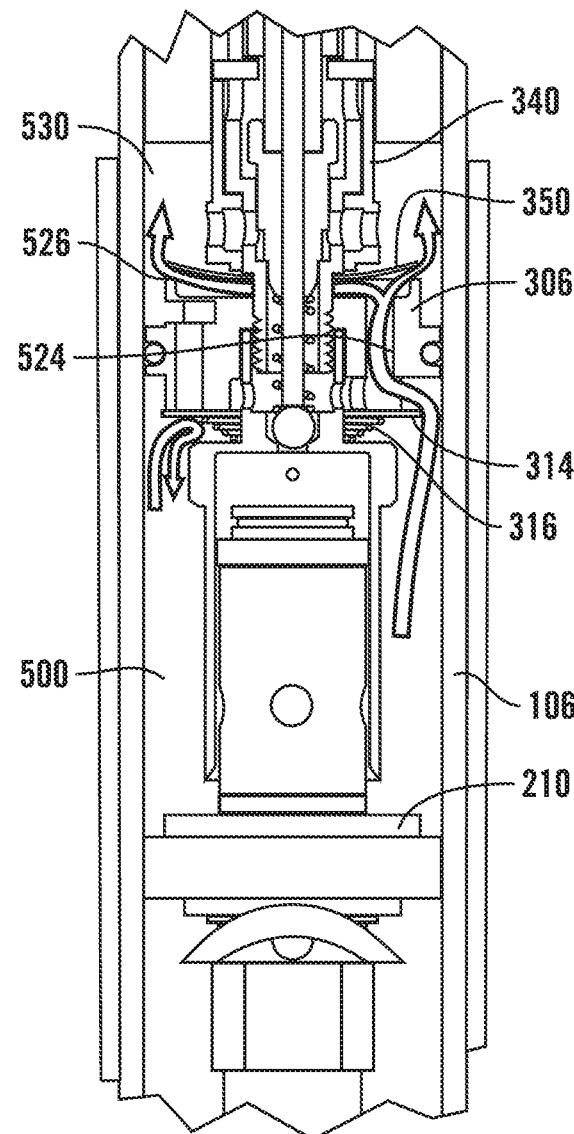

The high-speed compression system employs the a shim stack comprising a set of shim springs (e.g. having the form of a flange or washer secured with a clamp shim 348) as a flow control element as shown in FIGS. 14A-14B. See also FIG. 3D.

The high-speed adjustment mechanism provides at the top of the leg 106 a knob 112. See FIGS. 16A-16B (adjustment mechanism). As shown in FIGS. 16A-16B, rotation of the high-speed adjuster knob 112 rotates a preload adjuster 320 comprising a generally cylindrical tube with a helical notch or cut-out. Rotation of the preload adjuster 320 rotates (by hex connection) a hollow compression needle shaft 322 (installed over the central shaft or pin 334 for the bottom-out compression system) extending through a hollow compression (damper) shaft 304. See FIGS. 16A-16B (adjustment mechanism).

The hollow shaft 322 rotates (by hex connection) a screw 346. The screw 346 rotates and translates (by threaded connection). The screw 346 engages a wing washer 342 seated within the compression shaft 304 on the compression needle 322. See FIGS. 16A-16B. The wing washer 342 provides a pair of tabs or wings (e.g. projections) that extend through a pair of cutouts on the wall at the compression shaft 304. See FIG. 3D. The tabs of the wing washer 342 enable the axial translation of the screw 346 to be transmitted radially (laterally) from the center of the assembly to the outside the perimeter of the compression shaft 304 and then transmitted axially by engagement with a generally cylindrical-shaped preload shaft 340 (compression adjuster). See FIGS. 13A-13B. During assembly the wing washer 342 is inserted through a slot in the shaft and then rotated into position. See FIGS. 3D and 13A-13B. (Shim 344 provides a wear surface at wing washer 342 interface (e.g. at the adjustment mechanism).

According to an exemplary embodiment, the slots are of sufficient length for mechanical engagement as to transmit/translate the axial action to a radial/lateral action and then to an axial action to the adjuster and shim stack through the intended range of motion. According to alternative embodiment, for example, depending upon space constraints within the mechanism (e.g. insufficient space for long slots), the structure shown as wing washer 342 could be reconfigured or replaced by a set of several components (a ring with at least two screws or other arrangement to transmit the mechanical action as intended).

As shown in FIGS. 3D and 14A-14B, the shim stack 350 (set of washer-shaped shim springs providing flanges) functioning as the flow control element for the high-speed compression system is installed on the compression shaft 304 and the top of the flange portions of the shim 350 is engaged by the bottom rim of the preload shaft 340 as the bottom of the flange portions of the shim is supported on the top rim of a compression piston 306. See also FIGS. 16A-16B (adjustment mechanism). A force can be applied through the adjustment mechanism (rotation of the knob) transmitted to the preload shaft 340 to compress and hold or deflect (bend) the shim 350 under a preload (which can be imposed at a maximum preload force). See FIG. 13A. Removal of some or substantially all of the preload (to the minimum preload force) is effectuated at the adjustment mechanism (by rotation in the opposite direction). See FIG. 13B.

As shown schematically in FIGS. 14A and 14B, the amount of preload force set by the adjustment mechanism will determine the flow characteristics and therefore the high-speed compression response of the compression assembly (system). See also FIGS. 16A-16B (adjustment mechanism). Under a maximum preload force (see FIG. 14A) the flow of fluid through the flow control element is greatly restricted (and therefore a greater fluid force is required for flow across the element). Under a minimum preload force (see FIG. 14B) the flow of fluid through the flow control element is less restricted (and therefore a lesser fluid force is required for flow across the element). Compare FIG. 14A (maximum preload adjustment) with FIG. 14B (minimum preload adjustment). See also FIGS. 16A-16B (adjustment mechanism).

Referring to FIGS. 14A/B, operation of the high-speed compression system is shown according to an exemplary embodiment. Flow of fluid from lower chamber 500 into upper chamber 530 is regulated by the flow control element of the high-speed compression system (e.g. comprising a shim assembly (comprising shim 348, 350, 312, 310 and 308 and related assembly). As indicated in FIGS. 14A/B, high speed orifice 526 is opened by fluid pressure to enhance flow volume across the set of shims through passage 524 (from lower chamber 500 into upper chamber 530). According to an exemplary embodiment, the shims/shim assembly is deflected by fluid pressure; at high preload force, flow volume is reduced (see FIG. 14A); at low preload force, flow volume is enhanced (see FIG. 14B) (e.g. according to the degree of deflection of the shim/shim set)

As indicated in FIGS. 14A and 14B, according to an exemplary embodiment, the setting of the high-speed adjustment mechanism will determine the flow characteristics and therefore the high-speed (damping) response of the compression assembly (system). See also FIG. 18A.

Adjustment/Performance of the Compression System

According to an exemplary embodiment, the compression system/assembly of the front suspension fork provides for three externally-accessibly adjustment mechanisms providing generally co-located adjustment controls (e.g. knobs) at the top of the leg or casting/housing containing the compression assembly: (a) hydraulic bottom-out adjustment and (b) high-speed compression adjustment and (c) low-speed compression adjustment. See FIGS. 15A-15B, 16A-16B and 17A-17B. According to an exemplary embodiment, the compression assembly/system comprises an axially-oriented mechanism configured to transmit movement/adjustment radially from inner components to outer components of the mechanisms to be adjusted.

The configuration of the externally-accessible adjustment mechanisms provides a rider of a bicycle with the front suspension fork with the ability to conveniently make adjustments to "tune" the performance of the compression assembly of the fork (e.g. before a ride or during a ride or after a ride in preparation for the next ride).

According to an exemplary embodiment, adjustment of each adjustment mechanism of the compression assembly or system of the front suspension fork operates generally as follows:

(a) Bottom-out System. Rotating the bottom-out knob rotates the bottom-out adjuster and the threaded connection causes axial translation which changes the flow area through the bottom-out cup center port. See FIGS. 6A-6C and 8A-8C. See also FIGS. 15A-15B (adjustment mechanism).

(b) Low-Speed Compression System. Rotating the low-speed compression knob rotates the low-speed adjuster which translates the compression needle which translates the low-speed compression needle results in a change in low-speed compression characteristics. See FIGS. 11A-11B. See also FIGS. 17A-17B (adjustment mechanism).

(c) High-Speed Compression System. Rotating the high-speed compression knob rotates the preload adjuster and the hex connection causes rotation of the compression needle shaft and the screw; rotation of the screw causes translation of the screw, the wing washer (moving the translation from inside to outside the compression shaft), and the preload shaft which changes the preload on the shim stack resulting in a change in the high-speed compression damping characteristics. See FIGS. 14A-14B. See also FIGS. 16A-16B (adjustment mechanism).

As indicated, the adjustment of each setting (for each adjustment mechanism) is transmitted to the respective system to be adjusted independently (changing one setting does not change the other settings of other systems).

Operation of Low-Speed Compression System/High-Speed Compression System

According to an exemplary embodiment, the low-speed compression system and the high-speed compression system operate (as adjusted) together to define the flow characteristics of the compression (damping) system of the fork, as indicated in FIGS. 11A-11B and 14A-14B. See also FIG. 18A.

Figure 18A:
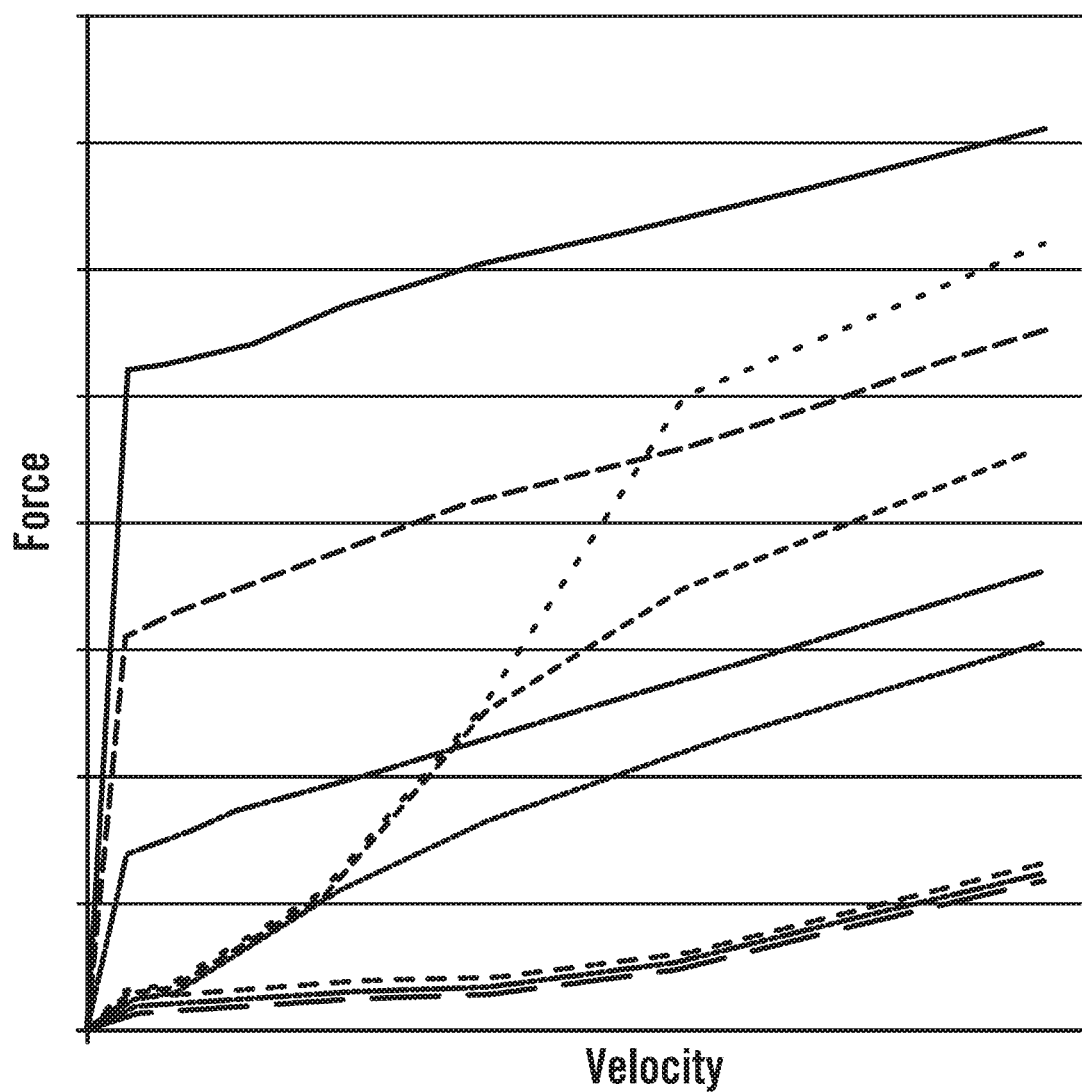
FIG. 18A is a schematic representational diagram of force-velocity response for the compression assembly for the fork according to an exemplary embodiment.

FIG. 18A is a schematic representation of force-velocity curves for the compression assembly or system. As indicated, the force-velocity curves represent in composite of the performance of the entire compression system (e.g. high-speed performance and low-speed performance). Different settings for the adjustment mechanisms provide (in composite) performance of the compression system along a different curve or profile shown in FIG. 18A (as indicated in the key or legend). The profile of the respective the force-velocity curves is determined by the configuration and performance of each of the compression mechanisms at a particular setting. The adjustment mechanisms provide the convenient ability to adjust the performance of the compression system within predefined limits more quickly and easily.

Hydraulic Bottom-Out System

According to an exemplary embodiment, the hydraulic bottom-out system provides an adjustment mechanism that is accessible to allow convenient adjustment without requiring disassembly of the fork. The externally-adjustable bottom-out system as shown comprises a rotating knob configured to control or restrict the flow area for fluid through a substantially central portion of the bottom-out system. Adjustment of the mechanism (by the knob) may allow the bottom-out system to be set in a range between fully (maximally) opened to flow or fully (substantially) closed to flow at or near the end of a stroke. A rider may conveniently adjust the bottom-out system by use of the externally-accessible adjustment mechanism. As the bottom-out system is closed to flow the bottom-out system provides a progressively greater ability to absorb force. As the bottom-out system is progressively opened to flow the bottom-out system provides progressively lower force to achieve full stroke.

Figure 18B:
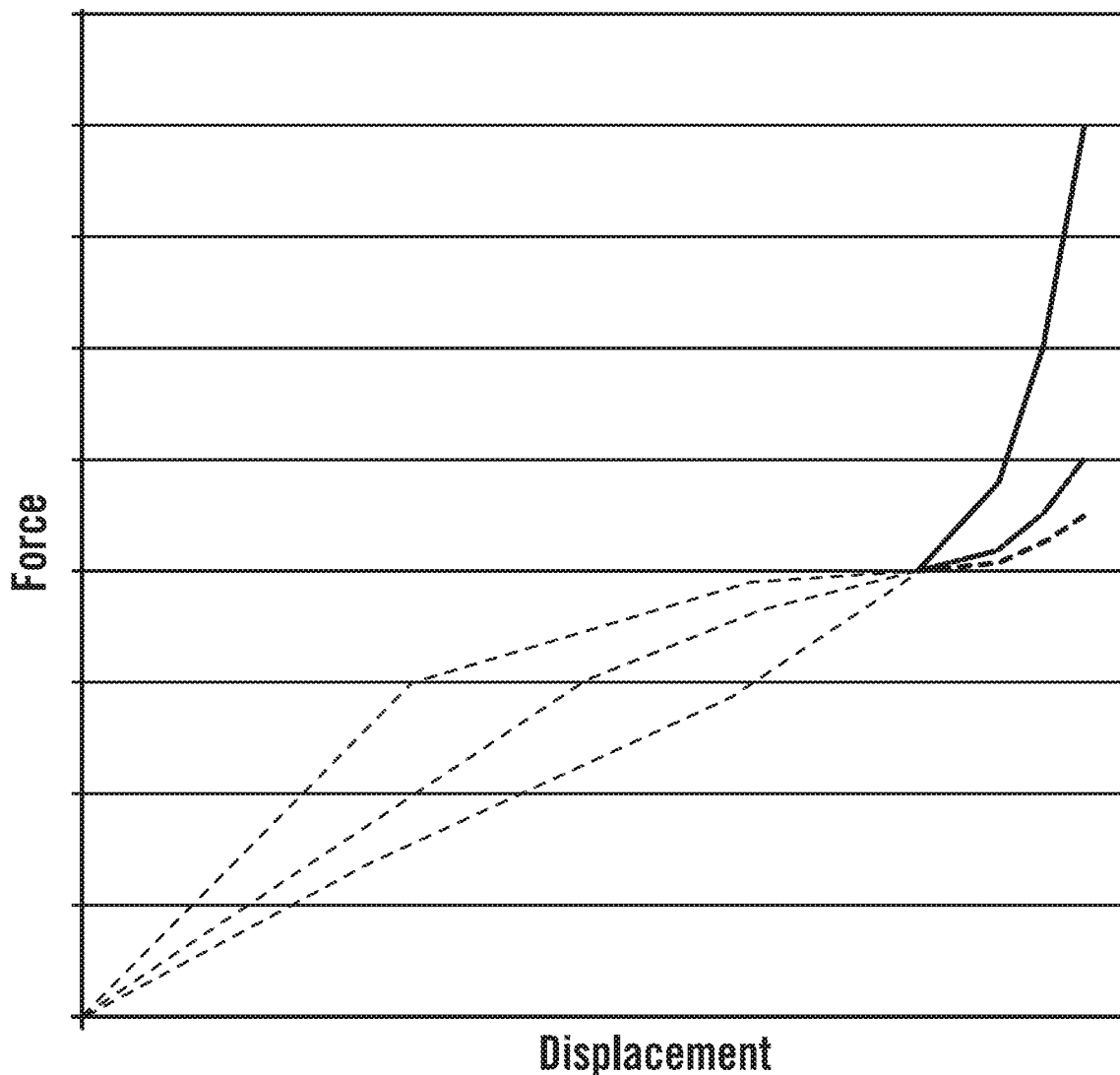
FIG. 18B is a schematic representational diagram of the force-displacement response with the bottom-out assembly of the compression assembly for the fork according to an exemplary embodiment.

FIG. 18B is a schematic representation of a force-displacement performance on the bottom-out system according to an exemplary embodiment. As indicated in FIG. 18B, the hydraulic bottom-out system only engages near the end of stroke over a defined distance when the piston enters the bottom-out cup. See also FIGS. 4A-4B. The force-displacement performance curves have two portions: (a) "lead-in" prior to engagement of the bottom-out system (e.g. before the piston of the rebound assembly enters the cup of the compression assembly) and (b) bottom-out performance (e.g. determined by the configuration and setting of the bottom-out mechanism).

The profile of the "lead-in" curve before the bottom-out system is engaged will depend on a variety of other factors, such as the high-speed compression assembly setting, low-speed compression assembly setting, the stroke velocity, etc.; depending upon the settings and such other factors, the profile of the force-displacement curve before bottom-out engagement (before the piston enters the bottom-out cup to cause a hydraulic bottom-out condition) may appear very different. Different lead-in curves show that different lead-in effects may occur in the stroke before the bottom-out condition. (Differences in the profile of the "lead-in" portion of the performance curve are generally illustrative but not directly relevant to the performance of bottom-out mechanism insofar as lead-in occurs before engagement of the bottom-out mechanism.)

Once the bottom-out condition engages increasing force is required to increase displacement as the bottom-out piston enters the bottom-out cup (see FIGS. 4A-4B); exit ports in the cup allow the hydraulic fluid to exit (see FIGS. 6A-6C and 8A-8C). The exit ports in the cup provide a fixed flow area (i.e. that cannot be adjusted by the bottom-out adjustment mechanism). The bottom-out adjustment mechanism allows adjustment of flow of hydraulic fluid through an additional port in the cap of the bottom-out cup that includes a flow control element (e.g. ball) as to allow adjustment of the flow area through the port (or closing of the port). As indicated in FIG. 18B, adjustment of the bottom-out adjustment mechanism will alter the performance/response of the bottom-out system as far as force absorption (dampening) and displacement (effective stroke or travel).

At the end of the stroke of the fork (e.g. when the compression assembly has been fully compressed) there is a hard stop. If the bottom-out mechanism is open and there is a very large impact force it is more likely that the hard stop will be reached (and a significant unabsorbed force transmitted through the frame of the bike to the rider). If the bottom-out mechanism is closed for the same impact force the force may be absorbed without reaching the hard stop (and without transmitting the same force through the frame of the bike to the rider). A still larger impact may result in the hard stop being reached regardless of whether the bottom-out is open or closed; however, in general forces transmitted to the rider at a hard stop will be less severe with the bottom-out closed.

On a ride the setting of the bottom-out mechanism will tend to affect the "feel" of the ride for the rider (with the bottom-out mechanism in the closed setting, providing a more "harsh" feel since the force is transmitted more rapidly rather than being absorbed). On a ride that will present less severe impacts that would not reach full stroke at bottom-out/hard stop, the rider may want to "soften" the feel by opening the bottom-out mechanism (e.g. given that the ride is without concern that a hard stop will be reached). A rider may want to try to set the bottom-out mechanism of the fork so as to be using the entire travel of the fork on the ride. With a "tame" trail the rider would want the bottom-out mechanism set to open; with a severe trail the rider would want bottom-out mechanism set to closed; and with an "aggressive" trail the rider might want bottom-out somewhere in between the open and closed settings.

It is important to note that the construction and arrangement of the elements of the inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A suspension assembly configured for use on a wheeled vehicle subjected to a cycle of compression and rebound during use comprising:
   (a) a housing;
   (b) a damping assembly configured to operate in a range of travel between substantially full compression and substantially full extension and to provide a damping effect for the cycle of compression and rebound comprising (1) an assembly configured to provide adjustable low-speed damping and (2) an assembly configured to provide adjustable high-speed damping;
   (c) a bottom-out system;
   (d) an adjustment actuator for low-speed damping;
   (e) an adjustment actuator for high-speed damping;
   (f) an adjustment actuator for the bottom-out system;
   wherein the adjustment actuator for low-speed damping and the adjustment actuator for high-speed damping are substantially co-located.

2. The suspension assembly of claim 1 wherein the bottom-out system is configured to operate with the damping assembly to provide a damping effect for compression approaching bottom-out in the cycle of compression and rebound.

3. The suspension assembly of claim 1 wherein the bottom-out system is configured to provide an additional damping effect for a portion of travel near full compression.

4. The suspension assembly of claim 1 wherein the adjustment actuator for low-speed damping is concentric with the adjustment actuator for high-speed damping.

5. The suspension assembly of claim 1 wherein the assembly for adjustable low-speed damping is coaxial with the assembly for adjustable high-speed damping and the bottom-out system.

6. The suspension assembly of claim 1 wherein each adjustment actuator comprises a knob external to the housing and each knob is concentric.

7. The suspension assembly of claim 1 wherein each adjustment actuator operates independently of each other adjustment actuator so that (a) low-speed damping can be adjusted independently of high-speed damping and bottom-out; (b) high-speed damping can be adjusted independently of low-speed damping and bottom-out; and (c) the bottom-out system can be adjusted independently of low-speed damping and high-speed damping.

8. The suspension assembly of claim 1 wherein the assembly for adjustable low-speed damping comprises a needle configured to operate as a flow control element for hydraulic fluid in the damping assembly; wherein the assembly for adjustable high-speed damping comprises at least one shim configured to operate as a flow control element for hydraulic fluid in the damping assembly; wherein the shim is configured to be under a pre-load actuated by the adjustment actuator for high-speed damping.

9. The assembly of claim 1 further comprising (g) a compression assembly comprising a flow control element and (h) a high-speed adjustment mechanism comprising the adjustment actuator for high-speed damping; wherein a preload force set by the high-speed adjustment mechanism will determine flow characteristics and therefore high-speed compression response of the compression assembly so that (a) under a maximum preload force the flow of fluid through the flow control element is greatly restricted and (b) under a minimum preload force the flow of fluid through the flow control element is less restricted; wherein the setting of the high-speed adjustment mechanism will determine flow characteristics and therefore high-speed response of the compression assembly.

10. The assembly of claim 1 further comprising (i) a low-speed adjustment mechanism comprising the adjustment actuator for low-speed damping; wherein the low-speed adjustment mechanism can be adjusted between a closed position and an open position so that (a) in the closed position a nose of a compression needle is seated within a rim of an opening of a compression shaft and flow through an opening in the compression shaft is obstructed by the nose of the compression needle; and (b) in the open position the compression needle has been translated upward and the nose is lifted out of the opening in the compression shaft and a path for flow of fluid is provided through the opening adjacent and around the nose; wherein the setting of the low-speed adjustment mechanism will determine flow characteristics and therefore low-speed response of the compression assembly.

11. A suspension assembly configured for use on a wheeled vehicle subjected to a cycle of compression and rebound during use comprising:
   a damping assembly configured to operate in a range of travel between substantially full compression and substantially full extension and to provide a damping effect for the cycle of compression and rebound with
   (1) a first adjustment assembly configured to regulate the flow of hydraulic fluid for the damping assembly actuated by a first adjustment actuator;
   (2) a second adjustment assembly configured to regulate the flow of hydraulic fluid for the damping assembly actuated by a second adjustment actuator;
   (3) a third adjustment assembly configured to regulate the flow of hydraulic fluid for the damping assembly actuated by a third adjustment actuator;
   wherein the first adjustment assembly and the second adjustment assembly are configured substantially in axial alignment.

12. The suspension assembly of claim 11 wherein the first adjustment assembly comprises an assembly configured to provide adjustable low-speed damping; wherein the second adjustment assembly comprises an assembly configured to provide adjustable high-speed damping; wherein the adjustment actuator for low-speed damping and the adjustment actuator for high-speed damping are substantially co-located exterior to the damping assembly.

13. The suspension assembly of claim 11 wherein the third adjustment assembly comprises a bottom-out system configured for at least one of (a) to operate with the damping assembly to provide a damping effect for compression approaching bottom-out and (b) to provide an additional damping effect for a portion of travel near full compression; and wherein an adjustment actuator for the bottom-out system is located exterior to the damping assembly to be accessed without requiring the use of a tool.

14. The suspension assembly of claim 11 wherein each adjustment assembly has a knob at one end and each knob is configured substantially in a concentric relationship accessible exterior to the damping assembly.

15. A suspension assembly configured for use on a wheeled vehicle subjected to a cycle of compression and rebound during use comprising:
   a damping assembly configured to operate in a range of travel between substantially full compression and substantially full extension and to provide a damping effect for the cycle of compression and rebound with (1) a first adjustment assembly configured to regulate the flow of hydraulic fluid for the damping assembly actuated by a first adjustment actuator;
(2) a second adjustment assembly configured to regulate the flow of hydraulic fluid for the damping assembly actuated by a second adjustment actuator;
(3) a third adjustment assembly for the damping assembly actuated by a third adjustment actuator;
wherein the first adjustment assembly and the second adjustment assembly are configured substantially in axial alignment.

16. The suspension assembly of claim 15 wherein the first adjustment assembly comprises an assembly configured to provide adjustable low-speed damping; wherein the second adjustment assembly comprises an assembly configured to provide adjustable high-speed damping; wherein the first adjustment assembly comprises an adjustment actuator for low-speed damping; wherein the second adjustment assembly comprises an adjustment actuator for high-speed damping.

17. The suspension assembly of claim 15 wherein the third adjustment assembly comprises a bottom-out system configured for at least one of (a) to operate with the damping assembly to provide a damping effect for compression approaching bottom-out in the cycle of compression and rebound; (b) to provide an additional damping effect for a portion of travel near full compression; (c) to operate with the damping assembly to provide a damping effect for compression.

18. The suspension assembly of claim 15 wherein the third adjustment assembly comprises an adjustment actuator for a bottom-out system.

19. The suspension assembly of claim 15 wherein the first adjustment assembly comprises an adjuster; wherein the second adjustment assembly comprises an adjuster; wherein the third adjustment assembly comprises an adjuster; wherein the adjuster of the first adjustment assembly and the adjuster of the second adjustment assembly are substantially co-located and configured in a concentric relationship accessible exterior to the damping assembly.

20. The suspension assembly of claim 18 wherein the adjustment actuator for the bottom-out system comprises an adjuster located exterior to the damping assembly to be accessed without requiring the use of a tool.

* * * * *